(12) United States Patent
Isomäki et al.

(10) Patent No.: US 10,043,306 B2
(45) Date of Patent: Aug. 7, 2018

(54) USING DEPTH DATA IN A GRAPHICS PROCESSING SYSTEM

(71) Applicant: ARM Limited, Cambridge (GB)

(72) Inventors: Marko Johannes Isomäki, Trondheim (NO); Christian Vik Grovdal, Trondheim (NO)

(73) Assignee: Arm Limited, Cambridge (GB)

( * ) Notice: Subject to any disclaimer, the term of this patent is extended or adjusted under 35 U.S.C. 154(b) by 15 days.

(21) Appl. No.: 15/182,302

(22) Filed: Jun. 14, 2016

(65) Prior Publication Data
US 2017/0024927 A1    Jan. 26, 2017

(30) Foreign Application Priority Data
Jun. 19, 2015   (GB) .................................. 1510866.5

(51) Int. Cl.
*G06T 15/40* (2011.01)
*G06T 11/40* (2006.01)
(Continued)

(52) U.S. Cl.
CPC ............ *G06T 15/405* (2013.01); *G06T 11/40* (2013.01); *G06T 15/005* (2013.01); *G06T 17/20* (2013.01)

(58) Field of Classification Search
None
See application file for complete search history.

(56) References Cited

U.S. PATENT DOCUMENTS

| | | | |
|---|---|---|---|
| 6,525,726 B1 * | 2/2003 | Xie | G06T 15/40 345/421 |
| 7,027,047 B2 * | 4/2006 | Kim | G06T 15/40 345/419 |

(Continued)

FOREIGN PATENT DOCUMENTS

| | | |
|---|---|---|
| GB | 2510964 | 8/2014 |
| GB | 2517032 | 2/2015 |
| GB | 2517033 | 2/2015 |

OTHER PUBLICATIONS

Bittner et al., Hierarchical Visibility Culling with Occlusion Trees, 1998, IEEE Computer Graphics International, pp. 207-219.*

(Continued)

*Primary Examiner* — Anh-Tuan V Nguyen
(74) *Attorney, Agent, or Firm* — Vierra Magen Marcus LLP

(57) ABSTRACT

A tile-based graphics processing system generates a render output by dividing it into a plurality of larger patches, each of which encompass a set of smaller patches. A rasterizer tests primitives against patches of the render output. When a primitive is found to completely cover a larger patch, depth function data for that primitive is stored in an entry of a depth buffer in respect of that largest patch position. When a subsequently-processed primitive is found to cover that same larger patch, the depth function data stored in the buffer is used to calculate depth range values for smaller patches that the larger patch encompasses. These depth range values, representative of the first primitive, are used to perform depth tests in respect of the second primitive. The depth function data stored in entry is then marked as invalid in respect of the smaller patches.

17 Claims, 9 Drawing Sheets

(51) Int. Cl.
*G06T 17/20* (2006.01)
*G06T 15/00* (2011.01)

(56) References Cited

U.S. PATENT DOCUMENTS

| | | | | |
|---|---|---|---|---|
| 7,068,272 B1* | 6/2006 | Voorhies | ............... | G06T 15/005 345/422 |
| 8,081,184 B1* | 12/2011 | Nordquist | ............. | G06T 15/005 345/426 |
| 2001/0055015 A1* | 12/2001 | Iourcha | ................... | G06T 15/40 345/421 |
| 2004/0246251 A1* | 12/2004 | Fenney | .................. | G06T 11/40 345/426 |
| 2008/0068375 A1* | 3/2008 | Min | ..................... | G06T 15/405 345/422 |
| 2012/0268465 A1* | 10/2012 | Inada | ..................... | G06T 11/00 345/428 |
| 2012/0293515 A1* | 11/2012 | Clarberg | ................. | G06T 15/00 345/441 |
| 2013/0141445 A1* | 6/2013 | Engh-halstvedt | ....... | G06T 5/002 345/506 |
| 2013/0241938 A1* | 9/2013 | Gruber | ................. | G06T 15/005 345/501 |
| 2013/0342547 A1* | 12/2013 | Lum | ....................... | G06T 11/40 345/505 |
| 2014/0085300 A1* | 3/2014 | Andersson | ................ | G06T 9/00 345/422 |
| 2014/0267258 A1* | 9/2014 | Yang | ..................... | G06T 15/405 345/422 |
| 2015/0022519 A1* | 1/2015 | Lum | ....................... | G06T 17/05 345/422 |
| 2015/0269771 A1* | 9/2015 | Hasselgren | ........... | G06T 15/005 345/422 |

OTHER PUBLICATIONS

GB Combined Search and Examination Report, dated Dec. 10, 2015, GB Patent Application GB1510866.5.

* cited by examiner

USING DEPTH DATA IN A GRAPHICS PROCESSING SYSTEM

BACKGROUND

The technology described herein relates to a method of and apparatus for processing graphics, and in particular to a method and apparatus for use when processing graphics primitives to generate a render output in a graphics processing system.

Graphics processing is normally carried out by first splitting, e.g. the frame to be displayed, into a number of similar basic components or "primitives", which primitives are then subjected to the desired graphics processing operations. The graphics "primitives" are usually in the form of simple polygons, such as triangles.

Each primitive is usually defined by and represented as a set of vertices. Each vertex for a primitive has associated with it a set of data (such as position, colour, texture and other attributes data) representing the vertex. This data is then used, e.g., when rasterising and rendering the primitive(s) to which the vertex relates, e.g. for display.

Once primitives and their vertices have been generated and defined, they can be processed by the graphics processing system, in order, e.g., to render the frame.

This process basically involves determining which sampling points of an array of sampling points covering the output area to be processed are covered by a primitive, and then determining the appearance each sampling point should have (e.g. in terms of its colour, etc.) to represent the primitive at that sampling point. These processes are commonly referred to as rasterising and rendering, respectively.

The rasterising process determines the sampling points that should be used for a primitive (i.e. the (x, y) positions of the sample points to be used to represent the primitive in the render output, e.g. frame to be displayed).

The rendering process then derives the data, such as red, green and blue (RGB) colour values and an "Alpha" (transparency) value, necessary to represent the primitive at the sample points (i.e. "shades" each sample point). This can involve, as is known in the art, applying textures, blending sample point data values, etc.

(In 3D graphics literature, the term "rasterisation" is sometimes used to mean both primitive conversion to sample positions and rendering. However, herein "rasterisation" will be used to refer to converting primitive data to sampling point addresses only.)

The rasterisation process basically maps the primitives defining the render output to be generated to the array of sampling points that will be used to render the output. This is typically done by determining, for each sampling point of the render output, whether the sampling point is covered by the primitive in question or not. This determination is typically done by testing the sampling points' positions against the edges of the primitive, to see if the sampling points are covered by the primitive. To do this, graphics processing systems typically derive (line) equations representing each of the edges of a primitive (e.g. using the defined vertices of the primitive), and then test the sampling points' positions using these edge equations. If a sampling point "passes" the edge test, it is taken to be within the primitive.

The rasterisation process is typically carried out by testing sets of one, or of more than one, sampling point. For each set of sampling points found to include a sample point that is covered by the primitive in question (being tested), a discrete graphical entity usually referred to as a "fragment" on which the graphics processing operations (such as rendering) are to be carried out is then generated by the rasteriser and sent to the rest of the graphics processing pipeline (such as the renderer) for processing.

One drawback of current graphics processing systems is that because primitives are processed sequentially, and typically not in perfect front-to-back order, a given sampling point (and hence fragment and pixel) may be shaded multiple-times as an output is processed, e.g. for display. This occurs when a first received and rendered primitive is subsequently covered by a later primitive, such that the rendered first primitive is not in fact seen at the pixel(s) (and sampling point(s)) in question. Primitives can be overwritten many times in this manner and this typically leads to multiple, ultimately redundant, rendering operations being carried out for each render output, e.g. frame, being rendered. This phenomenon is commonly referred to as "overdraw".

A number of techniques have therefore been proposed to try to reduce the amount of "overdraw" (the amount of redundant processing of hidden surfaces) that is performed when processing a render output, such as a frame for display (i.e. to avoid rendering non-visible primitives and/or fragments, etc.). For example, it is known to carry out forms of hidden surface removal before a primitive and/or fragment is sent for rendering, to see if the primitive or fragment etc. will be obscured by a primitive that has already been rendered (in which case the new fragment and/or primitive need not be rendered). Such hidden surface removal may comprise, for example, early occlusion culling, such as early-Z (depth) and/or stencil, testing processes.

These arrangements try to identify, e.g., sampling points for a new primitive that will be occluded by already processed primitives (and therefore that do not need processing) before the later sampling points are issued to the rendering pipeline. In these arrangements, the depth value, e.g., of a new primitive to be processed at the sampling positions in question is compared to the current depth values for those sampling positions in the depth buffer to see if the new primitive is occluded at the sampling positions in question or not. This can help to avoid sending fragments that are occluded by already processed primitives through the rendering pipeline.

The Applicants have developed a "hierarchical" rasterisation arrangement, in which primitives are iteratively tested against progressively smaller patches (regions) of the render output (target) area (and thus, correspondingly, patches of fragments (and patches of sampling positions)). A primitive to be rasterised is first tested against a larger patch (e.g. a tile in a tile-based graphics processing system) of the render output, to determine if the primitive covers (at least in part) any smaller patches of the render output that the larger patch encompasses. If the primitive does cover (at least in part) any smaller patches of the render output that the larger patch encompasses, then the larger patch is subdivided into those smaller patches, and the process is then repeated for each smaller patch of the render output that was found to be at least partially covered by the primitive, until a minimum patch size is reached.

a. The Applicants believe there remains scope for improvements to the use of hidden surface removal techniques, and in particular early depth testing when using a "hierarchical" rasterisation arrangement.

BRIEF DESCRIPTION OF THE DRAWINGS

Embodiments of the technology described herein will now be described by way of example only and with reference to the accompanying drawings, in which.

DETAILED DESCRIPTION

Figure 1:
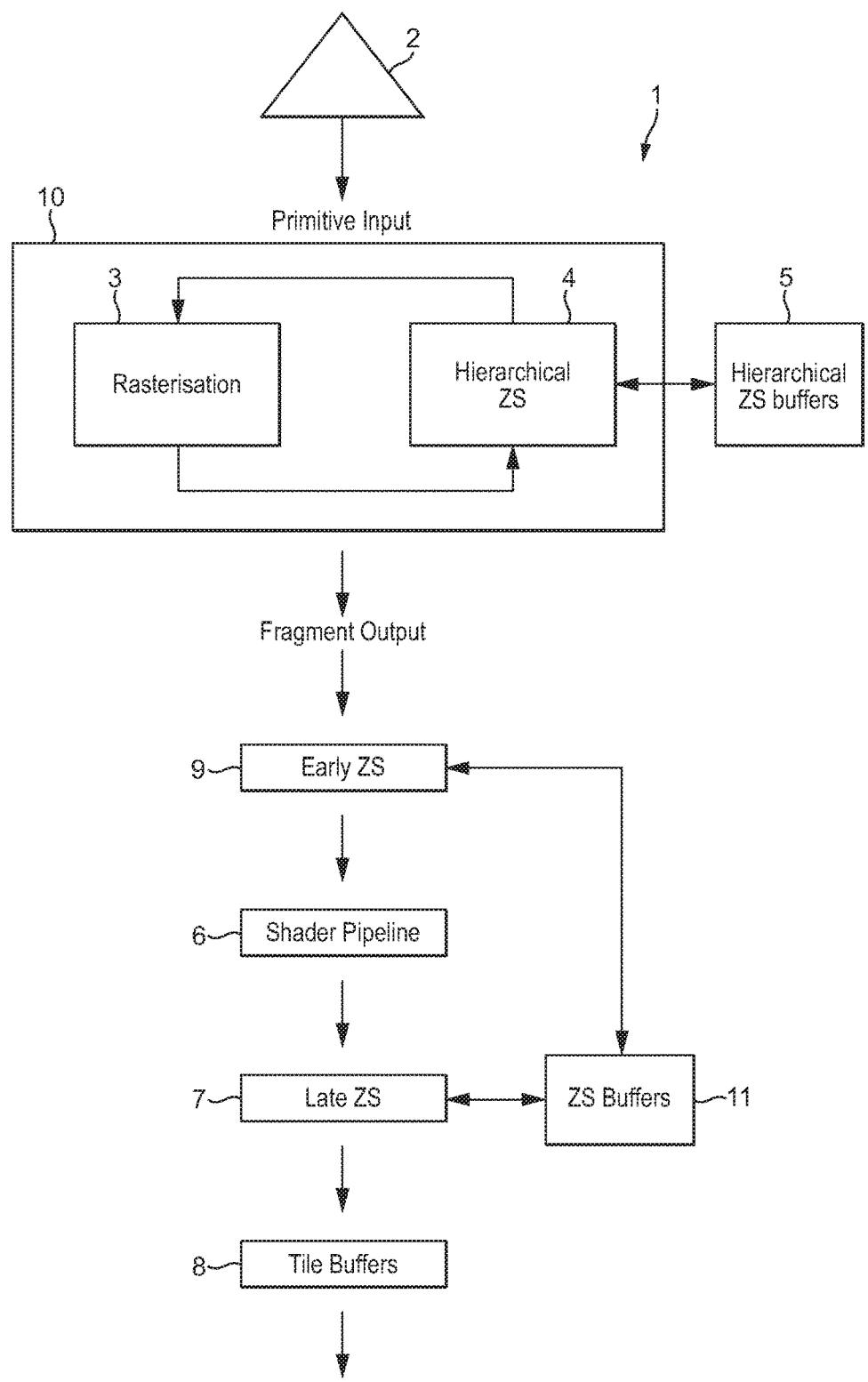
FIG. 1 shows schematically an embodiment of a graphics processing system that can operate in accordance with the technology described herein.

A first embodiment of the technology described herein comprises a method of processing primitives when generating a render output in a graphics processing system in which, for the purposes of generating a render output, the render output is divided into a plurality of larger patches, each larger patch of the render output encompassing a set of plural smaller patches of the render output, the method comprising:

testing a larger patch of the render output against a first primitive to be processed to generate the render output, to determine if the primitive at least partially covers the larger patch of the render output; and when it is determined that the primitive completely covers the larger patch of the render output, storing depth function data for the primitive for the larger patch of the render output;

the method further comprising:

testing the larger patch of the render output against a second primitive to be processed to generate the render output, to determine if the second primitive at least partially covers the larger patch of the render output; and when it is determined that the second primitive at least partially covers the larger patch of the render output, and when depth function data is stored for the larger patch of the render output:

using the depth function data to calculate depth data for the first primitive for each smaller patch of the render output of the set of plural smaller patches of the render output that the larger patch encompasses and that is at least partially covered by the second primitive; and marking the depth function data stored for the larger patch as invalid in respect of each smaller patch of the render output of the set of plural smaller patches of the render output that was determined to be at least partially covered by the second primitive.

A second embodiment of the technology described herein comprises a graphics processing pipeline comprising:

a rasteriser that, for the purpose of rasterising primitives when generating a render output, divides the render output into a plurality of larger patches, each larger patch of the render output encompassing a set of plural smaller patches of the render output;

the rasteriser further being capable of:

testing a larger patch of the render output against a primitive to be processed to generate a render output, to determine if the primitive at least partially covers the larger patch of the render output; and in response to a determination that a primitive completely covers a larger patch of the render output, storing depth function data for the primitive for the larger patch of the render output;

testing the larger patch of the render output against a further primitive to be processed to generate the render output, to determine if the further primitive at least partially covers the larger patch of the render output; and in response to a determination that the further primitive at least partially covers the larger patch of the render output, and in response to determining that depth function data is stored for the larger patch of the render output:

using the depth function data to calculate depth data for each smaller patch of the render output of the set of plural smaller patches of the render output that the larger patch encompasses and that is at least partially covered by the further primitive; and marking the depth function data stored for the larger patch as invalid in respect of each smaller patch of the render output of the set of plural smaller patches of the render output that was determined to be at least partially covered by the further primitive.

The technology described herein relates to the operation of a graphics processing system in which a render output which is divided into progressively smaller patches for rasterisation purposes. When a first primitive is found to fully cover a larger patch of the render output, depth function data for that first primitive is stored for that larger patch. The depth function data has the potential to derive depth values in respect of each of the smaller patches which the larger patch encompasses.

If a second primitive is then subsequently found to at least partially cover the larger patch, the depth function data stored for the larger patch is used to calculate depth data (values) relating to the first primitive for each of the smaller patches that the second primitive is found to (at least partially) cover. This newly-calculated depth data (which relates to the first primitive) may then, e.g., be, and in some embodiments is, used to perform a depth test in respect of the second primitive.

The first primitive depth function data is also marked as being "invalid" in respect of each of the smaller patches which is found to be (at least partially) covered by the second primitive. The depth information for these smaller patches will now, instead, be represented by depth data (as opposed to depth function data).

In other words, instead of, when a larger patch of a render output is found to be fully covered by a primitive, immediately calculating depth data for each of the smaller patches that the larger patch encompasses, a depth function representing the depth of the first primitive is stored for the larger patch. This can then be used to derive depth values for some or all of the smaller patches that the larger patch encompasses if and when necessary, e.g. if and when a second primitive is found to at least partially cover some or all of the smaller patches.

The Applicants have recognised in this regard that sometimes there may be no benefit to calculating depth data for a primitive for each and every (especially smaller) patch of a render output that the primitive covers. For example, if a primitive is found to completely cover a particular larger patch, but it so happens that no other primitive to be subsequently processed when generating the render output covers (either partially or otherwise) that particular larger patch, then there would be no benefit in calculating (and storing) depth values for the primitive for each (or indeed any) of the set of smaller patches which that particular larger patch encompasses. This is because there will not be any later primitives that will need that data to perform a depth test against.

At other times, however, it may be beneficial to calculate depth data for a primitive for each (or at least some of) the patches of a render output that the primitive covers. For example, if a primitive is found to (at least partially) cover a particular larger patch and data values are calculated (and stored) for the smaller patches which that larger patch encompasses which are found to be covered by that primitive, and if it so happens that many primitives to be subsequently processed when generating the render output also cover some of these smaller patches, then the depth data values which were calculated in respect of the first primitive can be used to perform depth tests in respect of these subsequent primitives. These tests can then (potentially) advantageously lead to the culling of (at least some of) these subsequently processed primitives, if it is found from the depth tests that (at least some of) these subsequently processed primitives are occluded by the first primitive.

The technology described herein includes storing depth function data for a larger patch when it is found that the larger patch is completely covered by a particular primitive, and then using this stored depth function to derive depth values for the smaller patches that the larger patch encompasses (only) if and when that depth data is needed to test against another primitive which is found to (at least partially) cover those smaller patches. This facilitates avoiding calculating depth value data for smaller patches unless there is a potential advantage to doing so (in that doing so may lead to another primitive being culled).

Thus, compared to prior art systems, the technology described herein can reduce the total number of depth data calculations that will need to be carried out when processing primitives which are found to completely cover larger patches of the render output, thereby, e.g. reducing power consumption. Moreover, the reduction in power consumption is achieved whilst maintaining the ability to efficiently (potentially) cull primitives that are subsequently processed.

The render output to be generated and that is divided into patches for the purposes of the rasterisation process in the technology described herein may comprise any render output that is to be generated by the graphics processing system (pipeline). Thus it may comprise, for example, a tile to be generated in a tile-based graphics processing system (pipeline), and/or a frame of output fragment data.

The patches that the render output is divided into for the rasterisation process can be selected as desired. Each patch within a given level of patches should represent a respective different region (area) of the render output to be generated.

In some embodiments the patches each correspond to a plurality of sampling positions of the render output to be generated.

The render output is divided into at least (but in some embodiments more than) two levels of patches. For example, the render may be divided into a plurality of largest (or "first level") patches. Each of these first level patches may then encompass a set of smaller second level patches. Each of these second level patches may then encompass a set of further smaller third level patches, and so on. In an embodiment, there are four levels of patches and, each of the largest (or first level) patches comprises an entire tile of a tile-based graphics processing system.

In some embodiments, the patches that the render output is divided into for the rasterisation process all have the same shape. Each patch that the render output to be generated is divided into for the rasterisation process is, in some embodiments, a regularly shaped area of the render output. In some embodiments the patches are rectangular (including square). In some embodiments, the patches are square. In some embodiments, all the patches at a given subdivision level have the same size, and, in some embodiments, also the same shape, as each other (i.e. cover the same number of sampling positions of the render output).

The respective sets of plural smaller patches of the render output that each larger patch of the render output is divided into (encompasses) may contain any desired (plural) number of smaller patches of the render output. In some embodiments, each set of plural smaller patches that a given larger, higher level patch encompasses comprises an integer number of plural smaller patches. In an embodiment, each larger patch is divided into a set of four smaller patches for the rasterisation process. In some embodiments, each larger patch is to be divided into (encompasses) a 2×2 set (array) of smaller patches.

Thus, in an embodiment, the patches are arranged such that a (and each) larger patch encompasses (and will accordingly be subdivided into) a set four smaller patches, with each smaller patch being a quarter of the size of the larger patch.

Varying the patch sizes by a factor of 4 in each successive subdivision level is a particularly convenient arrangement for progressively decreasing the patch size as the rasterisation process proceeds. However, it is not essential and other arrangements could be used if desired.

In some embodiments, each patch of the render output that is tested corresponds to an integer number of fragments, such as 16×16, 8×8, 4×4 and/or 2×2 fragments. In an embodiment, the largest patches each correspond to 16×16 fragments, with the next smaller second level patches being 8×8 fragments, and the third level, smaller patches being 4×4 fragments.

In some embodiments, each fragment represents sampling points (or sets of sampling points) of an array of sampling points covering the area of the render output to be generated. Each fragment may represent (have associated with it) a single sampling point, or plural sampling points, as desired. In some embodiments, each fragment represents a set of plural, in some embodiments a set of four (and in some embodiments a 2×2 array of), sampling points.

The rasterisation process could store depth function data for only one level of patches (e.g. the largest patch level) if it is determined that that patch is fully covered by a primitive, but in an embodiment wherein more than two levels of patches are supported, depth function data can be stored for more than one level of patches (e.g., and, in some embodiments, depth function data also can be stored for any one of the set of smaller patches which the largest patch encompasses, if it is determined that the smaller patch is fully covered by a primitive (wherein each of the smaller patches themselves then encompasses sets of further smaller patches)). In an embodiment, depth function data storage for three levels of patches is supported.

In some embodiments, the rasterisation process operates in a manner such that, if depth function data is stored (for a first primitive) for a patch of a particular level of patches, then the depth function data stored for that patch can be used to calculate depth data for the next (smaller) level of patches when it is determined that a second primitive at least partially covers the patch of the particular level of patches, in accordance with the technology described herein. In some embodiments, if, for example, depth function data can be stored for first, second and third levels of patches, then that depth function data can be used to calculate depth data for, respectively, the second, third and fourth levels of patches.

The rasterisation process could also, however, operate in such a manner that if depth function data is stored (for a first primitive) for a particular higher level (larger) patch, then that depth function data stored for that patch could be used to calculate depth data for any patches of any (smaller) level of patches that are encompassed by the larger patch, in accordance with the method of the technology described herein. For example, if depth function data can be stored for, e.g. a first (e.g. largest) level of patches, then in some embodiments this depth function data can be used to calculate depth data for each of (or any of) a second, third, fourth, etc., level of patches.

For embodiments in which depth function data storage is supported for multiple levels of patches, such that depth function data storage can be stored not only for the larger patch itself, but also for the smaller patches that the larger patch encompasses (in the manner of the technology described herein) (such smaller patches themselves encompassing further smaller patches), then if it is determined that a primitive completely covers a particular larger patch, the same depth function data can be, and in some embodiments is, stored not only for that larger patch, but also for each of the smaller patches that the larger patch encompasses.

In other words, if depth function data for a primitive is stored for a larger patch, and if the rasteriser is also capable of storing depth function data for the next (smaller) level of patches, then in some embodiments that same depth function data is also stored for each of the smaller patches which the larger patch encompasses. Similarly, if the rasteriser is further capable of storing depth function data for the next (further smaller) level of patches, then in some embodiments that same depth function data is also further stored for each of the further smaller patches which the smaller patch encompasses (and so on). The storage of depth function data will therefore propagate down each level of patch size for which such storage is supported.

The Applicants have recognised in this regard that if it is determined that a primitive completely covers a larger patch, that primitive will also necessarily completely cover each smaller patch that the larger patch encompasses. Thus storing depth function data for each of the smaller patches that the larger patch encompasses will enable (complete) depth data to be derived for each of the further smaller patches that each of the smaller patches encompasses.

Thus in an embodiment of the technology described herein, when it is determined that the first primitive completely covers the larger patch of the render output, depth function data for the primitive is also stored for each smaller patch that the larger patch encompasses, and when it is determined that the second primitive at least partially covers a smaller patch that the larger patch encompasses, the depth function data stored for the smaller patch is used to calculate depth data for the first primitive for each further smaller patch of the render output of the set of plural further smaller patches that the smaller patch encompasses and that is at least partially covered by the second primitive.

In some embodiments of the technology described herein, the rasterisation process is capable of testing more than one (two or more) levels of patches to determine if a patch is completely covered by a primitive, and can accordingly store depth function data for more than one (two or more) levels of patches. Thus the rasterisation process is capable not only of testing a first level patch against a primitive to determine whether or not that first level patch is completely covered by a primitive, and storing depth function data for the primitive for the first level patch on the basis of such a determination, but is also capable of testing a second level (i.e. smaller) patch against that primitive to determine whether or not that second level patch is completely covered by the primitive, and storing depth function data for the primitive for the second level patch on the basis of that determination. For systems wherein such a lower level patch testing and storing of depth function data is supported, this lower level testing step may occur when (and after) it is determined that the primitive does partially cover (but does not completely cover) the higher level patch.

The Applicants have recognised in this regard that even if a higher level (larger) patch is not completely covered by a particular primitive, there may still be potential benefits to storing depth function data for one or more of the smaller patches which the larger patch encompasses if the one or more smaller patches are completely covered by the primitive, so that depth function data can (potentially) be used to derive depth data for further smaller patches that the one or more smaller patches encompass. Thus, even if it is determined that a first level (larger) patch is not completely covered by a primitive, it may be beneficial to test whether or not each (or any) of the smaller patches which that larger patch encompasses is completely covered by the primitive, and, if it is, to store depth function data for the primitive for the each or any smaller patches, as appropriate.

Thus according to an embodiment of the technology described herein, when it is determined that the first primitive does not completely cover the large patch of the render output, the rasterisation process tests at least some of the smaller patches of the render output against the first primitive, to determine if the first primitive at least partially covers at least some of the smaller patches of the render output; and when it is determined that the primitive completely covers at least some smaller patches of the render output, depth function data for the primitive is stored for the completely covered at least some smaller patches of the render output.

The rasterisation process can test a particular patch of the render output against a particular primitive to determine if the primitive at least partially covers the patch in any suitable and desired manner. For example, the rasterisation process may test each edge of the primitive against the particular patch. These edge tests may be performed, for example, by deriving (line) equations representing each of the edges of the primitive, and testing these edge equations against the corners (or other sampling positions) of the patch, to see if the corners (or other sampling positions) are covered by the primitive or not. As mentioned above, if a sampling point "passes" the edge test, then it is taken to be within the primitive.

In an embodiment, the rasterisation process determines whether a patch is (at least partially) covered by a primitive, by one or more of, and in some embodiments, all of: determining whether the edges of the patch are within the primitive; testing whether edges of the patch are crossed by the primitive; and testing whether the vertices of the primitive are within the patch or lie on the edge of the patch.

In an embodiment, the rasteriser determines that a patch of the render output is at least partially covered by a primitive if at least one of the following conditions is met: at least one edge of the patch is within the primitive; at least one edge of the patch is crossed by an edge of the primitive; at least one vertex of the primitive is within the patch; or at least one vertex of the primitive is on a patch edge and, if the vertex is on the patch edge, another vertex of the primitive is on another edge of the patch, or if the vertex is on a corner of the patch, another vertex is on the opposite corner or on one of the opposite edges of the patch.

These tests may be performed as desired. In some embodiments, a grid of sampling points is derived for the patch (and for each patch) being tested, and those sampling points then used with (line) equations representing the edges of the primitive in question to determine if the patch is at least partially covered by the primitive.

The rasterisation process tests a larger patch of the render output against a primitive to determine if the primitive completely covers the larger patch. This can be determined in any suitable and desired manner. In an embodiment, a primitive is determined to completely cover a particular patch if that patch is found to entirely pass the edge test for each of (for all of) the edges of the primitive.

Upon determining that a primitive completely covers a (larger) patch of the render output, depth function data is stored for that primitive in respect of the (larger) patch. The depth function data that is stored may comprise any suitable function data that can (later) be used to derive depth data (e.g. a depth range and/or value or values that or is representative of that particular primitive in respect of each of the smaller patches that the larger patch encompasses. The depth function may represent a depth function equation and/or may represent coefficients of a particular depth function or equation, for example. In an embodiment, the depth function data that is stored for a primitive represents the values of the coefficients a, b and c of the z-plane function of the form $ax+by+c$ that represents depth values across the primitive.

The depth function data may be stored in any suitable and desired storage that is able to be accessed by the rasteriser. The storage may be dedicated storage for the purpose of storing depth function data, or it may be part of storage that is used to store other data in addition to the depth function data. The storage may be any suitable and desired information storage, such as, e.g., a register or registers, a buffer or buffers, a cache or caches, main memory, etc. In an embodiment, the storage comprises a buffer that is accessible by the rasteriser.

In some embodiments, upon determining that the primitive completely covers a (larger) patch of the render output, the rasterisation process forwards the primitive through the graphics processing pipeline and generates and issues fragments corresponding to that larger patch for rendering that (larger) patch for the primitive in question at that point, without further sub-dividing that (larger) patch into smaller patches. This then allows the rasterisation process to stop the rasterisation of a completely covered patch of the render output at a higher level in the rasterisation sub-division hierarchy, thereby further enhancing the efficiency of the rasterisation process.

In some embodiments the rasterisation process also (or alternatively) operates in a manner such that, after determining that the primitive completely covers the larger patch of the render output, depth function data may be stored for the primitive, but no other depth data is, at that stage (i.e. whilst processing that primitive), stored for the primitive for those smaller patches that are encompassed by the larger patch.

In other words, in some embodiments, after determining that a larger patch is fully covered by a primitive, the rasterisation process only stores depth function data for that larger patch (and, optionally, each or any of the smaller patches that the larger patch encompasses by propagating the depth function data to lower levels) at that time, but does not, at that time, calculate and/or store any other depth data (e.g. depth range values) for that primitive for those smaller patches that are encompassed by the larger patch.

(As will be understood, the calculating (and storing) of depth data other than depth function data for that (first) primitive for those smaller patches may still (eventually) be carried out (if necessary), but in some embodiments this will only happen at another (later) time, after determining that another (second) primitive at least partially covers those smaller patches. Thus, and as described above, in some embodiments the rasterisation process only calculates (and stores) depth data other than depth function data for the first primitive for those smaller patches if and when it is triggered to do so at a later time, i.e. if and when that depth data (e.g. depth range values) is needed to test against another (second) primitive (that is found to cover those smaller patches).)

If, on the other hand, it is found that the first primitive does not completely cover the larger patch of the render output, but does partially cover the larger patch, then in some embodiments the rasterisation process does not store depth function data for the first primitive for the larger patch. Instead, in some embodiments, the rasterisation process sub-divides the larger patch into smaller patches, without storing depth function data for the primitive for the larger patch, and tests the first primitive against those smaller patches of the render output. Depth function data and/or other depth data may then be then stored for each or any of those smaller patches (according to whether or not those smaller patches are respectively found to be covered, partially or completely, by the primitive).

When it is determined that a second primitive at least partially covers a larger patch for which depth function data (relating to a first primitive) is stored, the rasteriser retrieves the depth function data and uses it to calculate depth data for the first primitive for each smaller patch of the render output that the larger patch encompasses that is at least partially covered by the second primitive. The depth data that is calculated from the depth function data can comprise any suitable and desired depth (that is able to be calculated from the depth function data).

In some embodiments, the depth data for each smaller patch that is covered by the second primitive, and that is derived from the depth function data for the larger patch, comprises depth data that is more readily suitable to perform a depth test (e.g. to test the depth of the first primitive against depth of the second primitive) than the depth function data. In an embodiment, the depth data for a primitive that is derived for a particular smaller patch comprises a depth range and/or a depth value or values relating to that primitive over that particular smaller patch.

Depth data for a primitive (such as, e.g., a depth range) may be derived from the depth function data (e.g. a depth plane equation) in any suitable or desired manner. For example, depth data comprising a depth range may be derived by evaluating the depths various sampling positions across the patch using the depth function data (e.g. a depth plane equation, or coefficients thereof), and then choosing the highest and/or lowest of these depth values to be the depth data derived for that patch. Other methods for calculating depth data from depth function data are, of course, possible.

In some embodiments, when depth data (for a first primitive) has been calculated for each smaller patch at least partially covered by the second primitive, the rasterisation process uses this newly-calculated depth data (which may, and in some embodiments does, comprise depth range values for the first primitive) to then perform a depth test in respect of the second primitive (for each smaller patch that is at least partially covered by the second primitive). In other words, in some embodiments the newly-calculated depth data relating to the first primitive for a particular patch is tested against depth values relating to the second primitive for that patch. Performing a depth test for a particular patch allows the system to determine whether or not the second primitive is occluded by the first primitive over that particular patch (or vice-versa). As will be understood, performing a depth test for a particular smaller patch allows the rasterisation process to (potentially) cull the second primitive in respect of that patch, if the depth values relating to the second primitive are found to fail the depth test against the newly-calculated depth values for the first primitive in respect of that patch (i.e. if the second primitive is found to be occluded by the first primitive over that patch).

Thus in an embodiment of the technology described herein the newly-calculated depth data for the first primitive is used to perform a depth test in respect of the second primitive for each smaller patch of the render output of the set of smaller plural patches of the render output that is at least partially covered by the second primitive. In an embodiment, the depth test for a particular smaller patch is performed by comparing depth range values relating to the first primitive over that patch to depth range values relating to the second primitive over that particular patch.

After performing the depth test for each smaller patch that was found to be at least partially covered by the second primitive, the rasterisation process will, in some embodiments, store depth data (e.g. depth range values) for each of those smaller patches, based on the result of each of depth tests performed in respect of each of those smaller patches. In some embodiments, the depth data that will be stored in respect of each of the smaller patches for which a depth test was performed comprises depth data (e.g. a depth value range) relating to the first primitive, or depth data (e.g. a depth value range) relating to the second primitive, or a combination thereof.

Thus in an embodiment of the technology described herein, after the newly-calculated depth data for the first primitive is used to perform a depth test in respect of the second primitive for each smaller patch of the render output of the set of smaller plural patches of the render output that is at least partially covered by the second primitive, depth data is stored for each smaller patch of the render output of the set of smaller plural patches of the render output that is at least partially covered by the second primitive according to the result of the depth test.

The depth data that is stored in respect of each of the smaller patches for which a depth test was performed (according to the result of each of the depth tests) may be stored in any suitable and desired storage that is able to be accessed by the rasteriser. The storage may be any suitable and desired information storage, such as, e.g., a register or registers, a buffer or buffers, a cache or caches, main memory, etc. In an embodiment, the storage comprises a buffer that is accessible by the rasteriser. In some embodiments, the storage, e.g. depth buffer, is populated with up-to-date depth information (i.e. depth data, e.g. depth range data) relating to each of the smaller patches. Thus in some embodiments the storing of depth data for each smaller patch of the render output of the set of smaller plural patches of the render output that is at least partially covered by the second primitive according to the result of the depth test comprises updating the values stored in the, e.g. depth buffer, in respect of each of the smaller patches for which a depth test was performed, based on the results of those depth tests.

In some embodiments, the rasterisation process is able to store depth data for a particular smaller patch in parallel with (i.e. in addition to) storing depth function data for the larger patch that encompasses the smaller patch. In some embodiments, the rasterisation process is also able to store an indication for a smaller patch as to which of these two types of data (the depth function data stored for the larger patch or the depth data stored for the smaller patch itself) contains "valid" up-to-date depth data to represent that particular smaller patch (as discussed further below). Thus any particular smaller patch may, at any one time, be represented either by the depth function data stored for the larger patch, or, alternatively, by depth data (e.g. depth range values) stored for the smaller patch itself.

After using the depth function data stored for a larger patch to calculate depth data for each smaller patch that is found to be at least partially covered by the second primitive, the rasterisation process then marks the depth function data stored for the larger patch as invalid in respect of each of those smaller patches found to be at least partially covered by the second primitive (and for which, as will be understood, depth data has been newly calculated). By marking the depth function data as invalid in respect of those smaller patches, the rasterisation process stores an indication that (e.g. for the purposes of processing later primitives) these smaller patches should no longer be represented by depth function data (stored for the larger patch encompassing those smaller patches), but should now, instead, be represented by other depth data. As will be understood, this "other" depth data may, according to embodiments described above, be depth data (e.g. depth range values) that is to be stored for each of those smaller patches based on the result of the depth tests performed in respect of each of those smaller patches.

In other words, the rasterisation process marks (or makes note of) each of the smaller patches for which depth data has been calculated using depth function data for the first primitive stored for the larger patch. The depth function data is marked as invalid for these patches. By marking the depth function data as invalid for these patches, the rasterisation process keeps track of the fact that these smaller patches have had depth data derived for them (using the depth function data stored for the larger patch).

The depth function data stored for the larger patch can be marked as being invalid in respect of each smaller patch that was determined to be at least partially covered by the second primitive (i.e. in respect of each smaller patch for which depth data has been calculated using the depth function data) in any suitable and desired manner.

For example, the rasterisation process may mark the depth function data stored for the larger patch as invalid in respect of the smaller patch by storing separate data that indicates as such. This data may also, and correspondingly, be used as an indication to mark the depth data stored for the smaller patch itself (e.g. the depth value or values stored as a result of the depth test) as being valid. The indication therefore, in some embodiments, serves to show that the smaller patch will now be represented by depth data stored for the smaller patch itself, and will now no longer be represented by depth function data.

In an embodiment, the rasterisation process marks the depth function data as invalid in respect of those smaller patches by storing values in a bitmap that is representative of the set of smaller patches. In this particular embodiment, the bitmap stores either a 0 or 1 for each smaller patch of the set of smaller patches that are encompassed by a particular larger patch, according to whether or not the depth function data stored for the larger patch is valid or invalid in respect of that particular smaller patch. For example, after storing depth function data for the larger patch encompassing the set of smaller patches, but before that depth function data is used to calculated depth data for any of the smaller patches, the bitmap will store a set of values (e.g. all 1s) indicating that all of the smaller patches (encompassed by the larger patch) should be represented by the depth function data (stored for the larger patch). After depth data has been calculated for some of those smaller patches using the depth function data stored for the larger patch, however, the rasterisation process updates the entries in the bitmap relating to those smaller patches (e.g. by changing the stored values from 1 to 0) to indicate that the depth function data (stored for the larger patch) is now invalid in respect of those smaller patches. Thus at any particular time, the bitmap will contain either a 1 or a 0 in each entry relating to each smaller patch, indicating whether or not that particular smaller patch should be represented by depth function data stored for the larger patch (or should, e.g. be represented by other depth values).

It should be noted that the terms "larger" and "smaller" used herein refer only to the relative sizes of the particular patches. In an embodiment, the "larger" patch of the render output corresponds to the largest size of patch that the render output is divided into. However, the "larger" patch could also, instead, be a patch other than a patch of the set of the largest patches that the render output is divided into. The technology described herein only requires that the larger patch is not a patch from the set of the smallest level of patches that the render output is divided into. Likewise, the "smaller" patch could be from any particular level of patches, so long as it is from a level of patches that is smaller than the level of patches of the "larger" patch.

It should further be noted that the terms "first primitive" and "second primitive" used herein refer only to the order of the primitives as they are processed by the rasteriser in relation to each other. Thus, for example, it should be understood that the "first" primitive (as described herein) need not be the very first primitive that is processed for the render output (e.g. frame) (although it may so happen to be). Correspondingly, the "second" primitive (as described herein) need not be the second primitive that is processed by the rasteriser for the render output. Rather, the technology described herein only requires that the "first" primitive is processed by the rasteriser prior to processing the "second" primitive.

It should also be understood that the "second" primitive need not necessarily be processed directly (immediately) after the "first" primitive. Rather, the technology described herein may operate such that one or more other primitives are processed by the rasteriser in between the "first" and "second" primitives, i.e. after the "first" primitive is processed but before the "second" primitive is processed.

The technology described herein can be used irrespective of the form of output that the graphics processing system may be providing. Thus, for example, it may be used where the render output is intended to form an image (a frame) for display (e.g. on a screen or printer) (and in one embodiment this is the case). However, the technology described herein may also be used where the render output is not intended for display, for example where the render output is a texture that the graphics processing system is being used to generate (e.g. in "render to texture" operation), or, indeed, where the output the graphics processing system is being used to generate is any other form of data array.

The technology described herein is applicable to any suitable form or configuration of graphics processing system, graphics processor, and renderer, such as one having a "pipelined" arrangement. The technology described herein is particularly applicable to tile-based graphics processors and graphics processing systems, and to multi-core graphics processing systems. Thus, in an embodiment, the graphics processing system is a tile-based graphics processing system. Similarly, in an embodiment, the graphics processing system is a multi-core system (i.e. includes plural graphics processing cores).

The technology described herein accordingly extends to a graphics processor and a graphics processing pipeline including the apparatus of, or operated in accordance with the method of, any one or more of the embodiments of the technology described herein. Subject to any hardware necessary to carry out the specific functions discussed above, such a graphics processor can otherwise include any one or more or all of the usual functional units, etc., that graphics processors include.

The graphics processing system and pipeline can contain any suitable and desired processing stages, etc., that graphics processing pipelines and systems normally include. Thus, for example, in some embodiments it includes one or more of, and in some embodiments all of: a rasteriser, a renderer (in some embodiments in the form of a fragment shader), early and late depth and stencil testing stages (tester), a blender, a write-out unit, etc.

In the case of a tile-based (tiling) graphics processing system, in some embodiments the pipeline also comprises a tile buffer for storing tile sample values and/or a write out unit that operates to write the data in the tile buffer (e.g. once the data in the tile buffer is complete) out to external (main) memory (e.g. to a frame buffer).

In an embodiment, the various functions of the technology described herein are carried out on a single graphics processing platform that generates and outputs the rendered fragment data that is, e.g., written to a frame buffer for a display device.

In some embodiments, the system, pipeline, etc., comprises, and/or is in communication with, one or more buffers and/or memory devices that store the data described herein, and/or store software for performing the processes described herein. The system, pipeline, etc., may also be in communication with a host micro-processor, and/or with a display for displaying images based on the data generated by the graphics processing system.

The technology described herein can be implemented in any suitable system, such as a suitably configured micro-processor based system. In an embodiment, the technology described herein is implemented in a computer and/or micro-processor based system.

The various functions of the technology described herein can be carried out in any desired and suitable manner. For example, the functions of the technology described herein can be implemented in hardware or software, as desired. Thus, for example, the various functional elements, processing stages, and "means" of the technology described herein may comprise a suitable processor or processors, controller or controllers, functional units, circuitry, processing logic, microprocessor arrangements, etc., that are operable to perform the various functions, etc., such as appropriately configured dedicated hardware elements or processing circuitry and/or programmable hardware elements or processing circuitry that can be programmed to operate in the desired manner.

It should also be noted here that, as will be appreciated by those skilled in the art, the various functions, etc., of the technology described herein may be duplicated and/or carried out in parallel on a given processor. Equally, the various processing stages may share processing circuitry, etc., if desired.

Furthermore, any one or more or all of the processing stages of the technology described herein may be embodied as processing stage circuitry, e.g., in the form of one or more fixed-function units (hardware) (processing circuitry), and/or in the form of programmable processing circuitry that can be programmed to perform the desired operation. Equally, any one or more of the processing stages and processing stage circuitry of the technology described herein may be comprised as a separate circuit element to any one or more of the other processing stages or processing stage circuitry, and/or any one or more or all of the processing stages and processing stage circuitry may be at least partially formed of shared processing circuitry.

It will also be appreciated by those skilled in the art that all of the described embodiments of the technology described herein can include, as appropriate, any one or more or all of the optional features described herein.

The methods in accordance with the technology described herein may be implemented at least partially using software e.g. computer programs. It will thus be seen that when viewed from further embodiments the technology described herein comprises computer software specifically adapted to carry out the methods herein described when installed on a data processor, a computer program element comprising computer software code portions for performing the methods herein described when the program element is run on a data processor, and a computer program comprising code adapted to perform all the steps of a method or of the methods herein described when the program is run on a data processing system. The data processing system may be a microprocessor, a programmable FPGA (Field Programmable Gate Array), etc.

The technology described herein also extends to a computer software carrier comprising such software which when used to operate a graphics processor, renderer or microprocessor system comprising data processing means causes in conjunction with said data processing means said processor, renderer or system to carry out the steps of the methods of the technology described herein. Such a computer software carrier could be a physical storage medium such as a ROM chip, CD ROM, RAM, flash memory, or disk, or could be a signal such as an electronic signal over wires, an optical signal or a radio signal such as to a satellite or the like.

It will further be appreciated that not all steps of the methods of the technology described herein need be carried out by computer software and thus from a further broad embodiment the technology described herein comprises computer software and such software installed on a computer software carrier for carrying out at least one of the steps of the methods set out herein.

The technology described herein may accordingly suitably be embodied as a computer program product for use with a computer system. Such an implementation may comprise a series of computer readable instructions either fixed on a tangible medium, such as a non-transitory computer readable medium, for example, diskette, CD ROM, ROM, RAM, flash memory, or hard disk. It could also comprise a series of computer readable instructions transmittable to a computer system, via a modem or other interface device, over either a tangible medium, including but not limited to optical or analogue communications lines, or intangibly using wireless techniques, including but not limited to microwave, infrared or other transmission techniques. The series of computer readable instructions embodies all or part of the functionality previously described herein.

Those skilled in the art will appreciate that such computer readable instructions can be written in a number of programming languages for use with many computer architectures or operating systems. Further, such instructions may be stored using any memory technology, present or future, including but not limited to, semiconductor, magnetic, or optical, or transmitted using any communications technology, present or future, including but not limited to optical, infrared, or microwave. It is contemplated that such a computer program product may be distributed as a removable medium with accompanying printed or electronic documentation, for example, shrink wrapped software, pre loaded with a computer system, for example, on a system ROM or fixed disk, or distributed from a server or electronic bulletin board over a network, for example, the Internet or World Wide Web.

A number of embodiments of the technology described herein will now be described.

FIG. 1 shows schematically a graphics processor 1 in the form of a graphics processing pipeline that may operate in accordance with the technology described herein.

FIG. 1 shows the main elements and pipeline stages of the graphics processor 1 that are relevant to the operation of the present embodiment. As will be appreciated by those skilled in the art there may be other elements of the graphics processor that are not illustrated in FIG. 1. It should also be noted here that FIG. 1 is only schematic, and that, for example, in practice the shown functional units and pipeline stages may share significant hardware circuits, even though they are shown schematically as separate stages in FIG. 1. It will also be appreciated that each of the stages, elements and units, etc., of the graphics processor as shown in FIG. 1 may be implemented as desired and will accordingly comprise, e.g., appropriate circuitry and/or processing logic, etc., for performing the necessary operation and functions.

The graphics processing system shown in FIG. 1 is a tile-based system. The graphics processor 1 will thus, as is known in the art, produce tiles of a render output data array, such as an output frame to be generated. (The technology described herein is equally applicable to other systems, such as immediate mode rendering systems.) The output data array may, as is known in the art, typically be an output frame intended for display on a display device, such as a screen or printer, but may also, for example, comprise a "render to texture" output of the graphics processor, etc.

FIG. 1 shows schematically the pipeline stages after the graphics primitives (polygons) 2 for input to the rasterisation process have been generated. Thus, at this point the graphics data (the vertex data) has undergone transformation and lighting operations (not shown), and a primitive set-up stage (not shown) has set-up the primitives to be rendered in response to the commands and vertex data provided to the graphics processor 1, as is known in the art.

As shown in FIG. 1, this part of the fragment processing pipeline of the graphics processor 1 includes a number of processing stages, including a rasteriser 10 that includes a rasterisation stage 3 and a hierarchical ZS (depth and stencil) test stage 4, an early ZS (depth and stencil) test stage 9, a rendering stage in the form of a fragment shading stage 6, and a late ZS (depth and stencil) test stage 7. The pipeline also includes and/or has access to (is in communication with) appropriate memory for storing the data that the pipeline will use and/or generate, such as a hierarchical depth and stencil buffer(s) 5, depth and stencil buffer(s) 11, tile buffers 8, etc.

The rasteriser 10 operates, as is known in the art, to rasterise the primitives making up the render output (e.g. the image to be displayed) into individual graphics fragments for processing. To do this, the rasteriser 10 receives graphics primitives 2 to be rendered, rasterises the primitives to sampling points and generates graphics fragments having appropriate positions (representing appropriate sampling positions) for rendering the primitives. In the present embodiment, each graphics fragment that is generated by the rasteriser 10 represents (has associated with it) plural (and normally four) sampling positions. (Other arrangements would, of course, be possible). Each graphics fragment has associated with it a coverage mask indicating which sampling points of the plural sampling positions that the fragment represents, it is actually being used to render (i.e. are actually covered by the primitive in question).

In the present embodiment, the rasteriser 10 is a hierarchical rasteriser that may iteratively test primitives against progressively smaller patches (regions) of the render output (target) area (and thus, correspondingly, patches of fragments), down to a minimum patch size corresponding, in the present embodiment, to a 2×2 group of fragments (i.e. to an array of sampling points that would be rasterised to a 2×2 group of fragments), discarding any patches that are not (at least in part) covered by the primitive. Each patch that is tested corresponds to a given set of fragments.

The rasterisation stage 3 of the rasteriser 10 performs this render output patch testing. To do this, it starts with a large patch (which, in the present embodiment, corresponds to the size of an entire tile) of the render output (the render target) area and tests the patch against the edges of the primitive in question to determine if the primitive completely covers the large patch or at least partially covers the large patch (i.e. at least partially covers any patch of a 2×2 set of smaller patches of the render output (the render target area) that the large patch is divided into (encompasses)).

The edges of the primitive are represented by appropriate line (edge) equations that have been derived from the vertices of the primitive, as is known in the art, and a grid of sampling points is derived for the patch (and for each patch) being tested. The patch sampling points are then used with the line equations representing the edges of the primitive in question to perform an edge test for the edges to determine if the patch is at least partially covered by the primitive.

In the present embodiment, the rasterisation stage 3 determines that a patch of the render output is at least partially covered by a primitive if at least one of the following conditions is met: at least one edge of the patch is within the primitive; at least one edge of the patch is crossed by an edge of the primitive; at least one vertex of the primitive is within the patch; or at least one vertex of the primitive is on a patch edge and, if the vertex is on the patch edge, another vertex of the primitive is on another edge of the patch, or if the vertex is on a corner of the patch, another vertex is on the opposite corner or on one of the opposite edges of the patch.

The rasterisation stage determines that a large patch of the render output is completely covered by a primitive if that patch is found to entirely pass the edge test for each of (for all of) the edges of the primitive.

If it is found that the large patch is not covered by the primitive at all, then the patch is not processed further in respect of the primitive in question (i.e. the entire patch is discarded for the primitive in question), and another (the next) large patch is tested against the primitive, and so on.

On the other hand, if the primitive is found to at least partially cover the large (i.e. at least partially cover any of the smaller patches of the set of plural smaller patches of the render output that the large patch encompasses (is divided into)), then the large patch is forwarded by the rasterisation stage 3 to the hierarchical ZS testing stage 4. According to the outcome of the depth and stencil tests performed by the hierarchical test stage 4 (see below), the large patch may then be returned to the rasterisation stage 3 to be subdivided into its four smaller patches, with each covered such smaller patch ("sub-patch") then tested against the primitive and processed in the same way (i.e. discarded; or forwarded to the hierarchical depth testing stage 4 and later returned to the rasterisation stage 3 and subdivided into a set of smaller patches). This patch testing and discarding or subdivision is continued until the minimum patch size is reached.

The present embodiment supports four levels of subdivision (three sub-division iterations) and so starts with large patches corresponding to 16×16 fragments, which are then (if appropriate) subdivided into four 8×8 fragment patches. Each of those 8×8 fragment patches is then subdivided into respective 4×4 fragment patches (if appropriate). Finally, each 4×4 fragment patch is subdivided into respective 2×2 fragment patches (if appropriate). As in the present embodiment, a 2×2 fragment patch is the minimum patch size that is used, the (potential) subdivision process stops at this point. Other arrangements would, of course, be possible.

Figure 2:
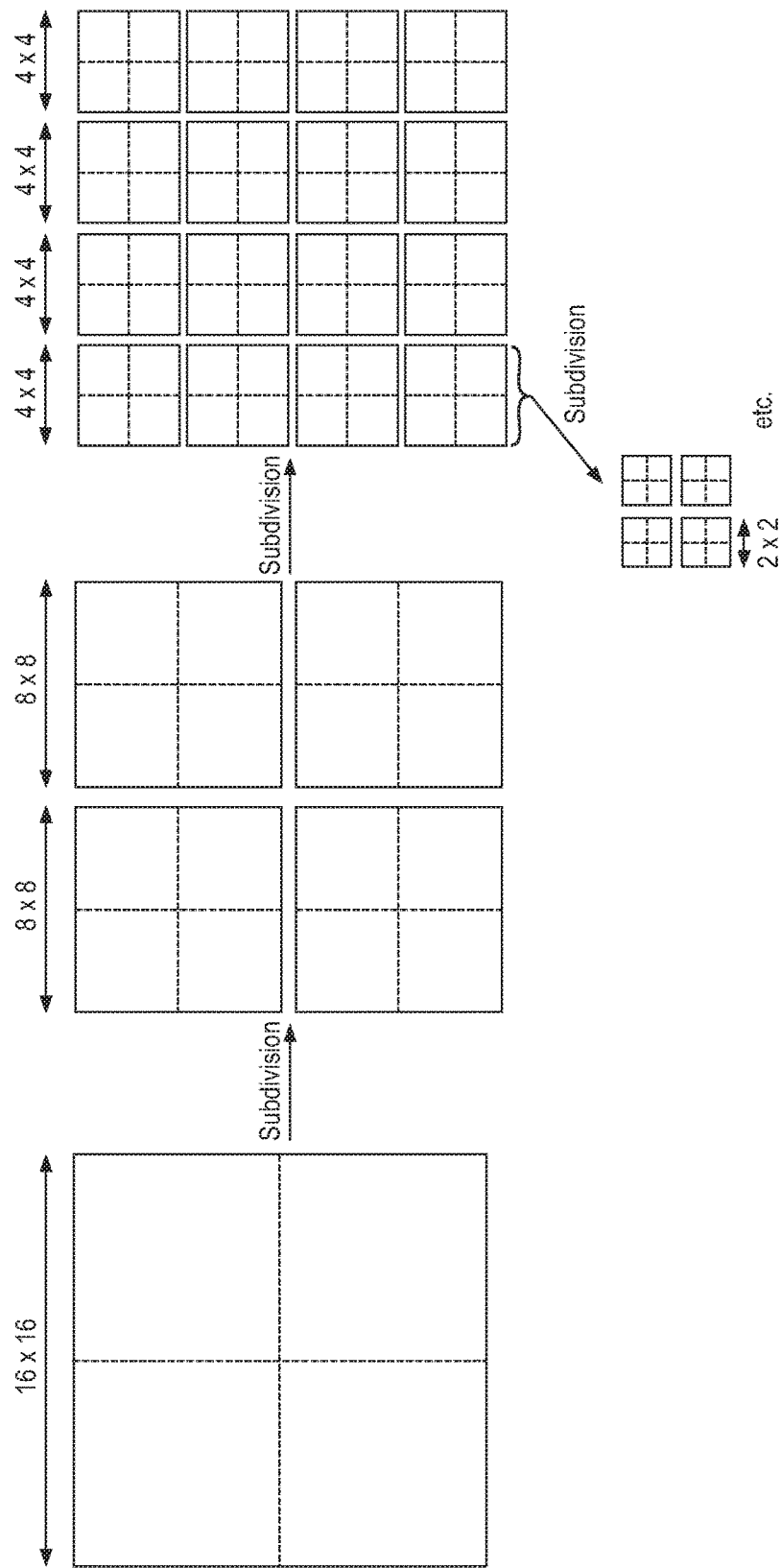
FIG. 2 illustrates the sub-division process that is used by the rasteriser in the described embodiment of the technology described herein.

FIG. 2 illustrates the subdivision process and shows a top level, 16×16 fragment, patch being progressively subdivided down to the minimum patch size of 2×2 fragments.

Once the minimum patch size has been reached (i.e. a patch of 2×2 fragments that covers, at least in part, the primitive has been identified), the rasterisation stage 3 then tests the individual sampling points in that final patch to see if the sampling points are covered by the primitive. The rasteriser 10 then generates and outputs individual fragments for rendering corresponding to the sampling points found to be covered by the primitive (so four fragments if all the 2×2 fragments in the minimum size patch are at least partially covered by the primitive).

(As will be discussed further below, the process of iteratively subdividing and testing may be skipped for a large patch that is completely covered by the primitive. In this case, the rasteriser 10 generates and outputs a set of fragments corresponding to the entire large patch without subdividing that large patch.)

The rasteriser 10 also associates with each fragment a coverage mask in the form of a bitmap that indicates, for each sample position of the set of sample positions that is associated with the fragment, whether that sample position is covered (i.e., in effect, whether the fragment is being used to render that sampling point (i.e. whether its data should be stored for that sampling point)).

In the present embodiment, each primitive to be rasterised is tested against each first level (larger size) patch of the render output that falls within (is covered by) a bounding box generated for the primitive. Other arrangements would, of course, be possible.

Once the largest size patch (which corresponds to the size of a tile) of the render output has been tested against a primitive (and subdivided or discarded, as appropriate), then the rasterisation process moves on to the next primitive for the render output being generated and so on, until all the primitives for the render output in question have been rasterised.

The process then moves on to the next render output (e.g. tile) to be generated once all the primitives for the render output in question have been rasterised, and so on.

The rasteriser 10 is configured in the present embodiment as a pipeline that can contain and process plural patches at the same time. The rasteriser 10 is also configured to be able to generate plural fragments at a time (simultaneously) (e.g. where a primitive is found to completely cover a patch of the render output that encompasses plural fragments (e.g. plural sampling points or sets of sampling points)). The fragments are still processed individually by the fragment processing parts of the pipeline, such as the renderer (fragment shader). Having the rasteriser produce plural fragments simultaneously helps to create back pressure to thereby keep the rendering pipeline "filled up" with fragments.

Other arrangements would, of course, be possible.

As shown in FIG. 1, the rasteriser 10 also has a hierarchical depth (Z) and stencil testing stage 4 associated with it. This hierarchical depth and stencil testing stage 4 performs "early" depth and stencil tests on the patches generated by the rasterisation stage 3 to see if those patches can be culled.

To do this, each patch of the render output generated by the rasterisation stage 3 is sent to the hierarchical depth and stencil test stage 4, which then performs a Z (depth) test on the patch to see if the patch can be discarded (culled) at this stage. At the same time, an early stencil test is carried out.

The hierarchical depth and stencil test stage 4 is in communication with hierarchical ZS buffer 5. A more detailed schematic of the hierarchical ZS buffer 5 is shown in FIG. 3. The hierarchical ZS buffer 5 can store a range of depth values (and a stencil value) for each patch size and position that the buffer represents (essentially for each patch size and position that the rasterisation stage 3 could generate for the tile that is being processed) in a depth value storage array 21. FIG. 3 shows the depth range value entries in depth value storage 21 for the single level 0 patch size (i.e. the 16×16 patch, the largest patch), the four (smaller) 8×8 level 1 patches, and the sixteen (further smaller) 4×4 level 2 patches.

In addition to this, the hierarchical depth buffer 5 is can store depth function data (discussed further below) in a depth function storage array 22.

Each patch position (other than the single, largest level 0 patch) may, at any given time, be represented in the hierarchical ZS buffer 5 either by depth range values stored in an entry relating to that patch position in the depth value storage 21, or, alternatively, by depth function data stored in depth function storage 23. For example, a patch position that corresponds to entry 25 in depth value storage 21 may at any given time, either be represented by the depth range values stored in that entry 25 for that patch position, or may, alternatively, be represented by the depth function data stored in depth function data entry 23 of the depth function storage 22.

Further, some patch positions may be represented by depth function data, whilst some other patch positions may be represented by depth range values, at any given time.

To indicate which patch positions are represented by depth data values stored in depth value storage 21, and which patch positions are represented by depth function data stored in depth function storage 22, the hierarchical ZS buffer 5 also stores a bitmap containing an entry for each patch position (other than the single largest level 0 patch) that the buffer represents. In the present embodiment, the bitmap stores either a 0 or 1 in each entry for each patch position according to whether that patch position is represented by the corresponding depth range value stored in the depth value storage 21, or, alternatively, is represented by depth function data stored in the depth function storage 23. In the present embodiment, a value of "0" is used to indicate that the corresponding patch position is represented by the corresponding depth range values stored in the depth value storage 21 (and correspondingly, that the depth function data stored in the depth function storage 22 is "invalid" in respect of that patch position). A value of "1" is used to indicate that the corresponding patch position is represented by depth function data stored in the depth function storage 22 (and correspondingly, that the depth range values stored for that patch position in the depth value storage 21 are "invalid" in respect of that patch position).

The depth range values that are stored in the depth value storage 21 for each patch are initially set to default values, or to expected depth range values for the patch (if that can be determined). (In some arrangements, the possible depth values that primitives for a tile may have may be known in advance. This can then be used to populate the depth buffer 5 with ranges of expected depth values for the patches in question.) The depth function data that is stored in the entries of the depth function storage 22 may also initially be set to a default value (although this is not strictly necessary). Each entry in the bitmap is also initially set to a value of "0", to indicate that each patch position is (initially) represented by depth range data values (the default values) stored for that patch in the relevant entry of the depth value storage 21.

When a largest (level 0) patch of the render output is generated by the rasterisation stage 3, the large patch is forwarded to the hierarchical depth and stencil test stage 4, which then performs a Z (depth) test on the patch to see if the patch can be discarded (culled) at this stage. At the same time, an early stencil test is carried out.

In the present embodiment, the hierarchical depth tester 4 performs a depth test on a large patch generated by the rasterisation stage 3 by using a depth value range for the large patch (representative of the primitive that (at least partially) covers that patch) by taking appropriate depth samples across the patch, and comparing that depth value range for the large patch with the depth range data already stored in the corresponding entry 26 (of the depth range value storage 21 in the hierarchical 25 buffer 5) for that large patch (entire tile) position, to try to determine whether that large patch will be occluded by or overdraw other fragments and sampling points to be rendered. If the patch passes the early depth test, then the depth value ranges stored in that entry 26 of the hierarchical depth buffer 5 are updated accordingly.

How the rasteriser 10 operates next will depend on whether or not the large patch (which has now passed the depth test) was found by the rasterisation stage 3 to be completely covered by the primitive being processed for that patch, or whether it was found to be only partially covered by the primitive.

If the large patch was found by the rasterisation stage 3 to be only partially (i.e. not completely) covered by the primitive, then the larger patch is returned to the rasterisation stage 3 for subdivision into smaller patches ("sub-patches") as discussed above. (These sub-patches may then be returned to the early hierarchical depth and stencil tester 4 for testing themselves (see below), and so on, until the minimum patch size is reached.)

If, however, that large patch was also found by the rasterisation stage 3 to be completely covered by the primitive being processed, then the rasteriser 10 will store depth function data for the large patch that is representative of the primitive that completely covers that patch in the depth function storage 22 of the hierarchical depth buffer 5. This depth function data is stored initially in the depth function entry 23 corresponding to level 1 patch positions, but, as the primitive is forwarded through the graphics processing pipeline, the depth function data will also be propagated down into the depth function entry 24 corresponding to level 2 patch positions. (If any depth function data (e.g. depth function data representative of a previously-processed primitive) is already stored in the depth function storage 22, then this data will be overwritten.)

In the present embodiment, the depth function data that is stored comprises the values of the coefficients a, b and c of the z-plane function of the form $ax+by+c$ that represents depth values for the primitive being processed (that completely covers the large patch) across the large patch. (As will be discussed further below, this depth function data may later be used to derive depth range values representative of the primitive for each of the positions of each of the smaller patches that are encompassed by the large patch.)

In the present embodiment, the rasteriser 10 also updates the values stored in the bitmap for each (every) smaller patch position that is encompassed by the large patch (i.e. all the level 1 and level 2 patches), to show that each of these patch positions are now no longer represented by depth range data values stored in the depth value storage 21 for the individual patch positions, but are instead represented by the depth function data stored for the large patch (that has now propagated down, and been stored for, each of the smaller patch positions) in the depth function storage 22. In the present embodiment, the rasteriser 10 does this by setting each entry of the bitmap stored in the depth buffer 5 to "1".

Instead of returning the completely-covered large patch to the rasterisation stage 3 for subdivision and further testing, the rasteriser 10 generates and outputs a set of fragments corresponding to the entire large patch without subdividing that larger patch.

The preceding description relates to the steps undertaken by the hierarchical depth and stencil testing stage 4 when performing depth testing on a large (level 0) patch generated by the rasterisation stage 2. However, the hierarchical depth and stencil testing stage 4 will also perform "early" depth and stencil tests on smaller patches (i.e. level 1 and level 2 patches that are of smaller size than the large patch) that are generated by the rasterisation stage 3 (e.g. after subdividing a large patch), to see if those patches can be culled.

Prior to performing the "early" depth test on smaller patches however, the hierarchical depth testing stage 4 first checks the bitmap entry for the corresponding patch position in the bitmap stored in the in the hierarchical depth buffer 5, to determine whether the up-to-date depth information for that patch position is represented by depth function data stored in the depth function storage 22, or is, instead, represented by depth range values stored for that individual patch position in the depth range value storage 21.

If (upon reading the relevant bitmap entry) it is determined that depth information for that patch position is represented by depth range values stored for that individual patch position, then the hierarchical depth testing stage 4 performs a depth test in a similar manner as described above, i.e. by using a depth value range for the patch representative of the primitive that is being tested (by taking appropriate depth samples across the patch for the primitive), and comparing that depth value range for the primitive for the patch with the depth range data already stored in the relevant entry of the depth range storage 21 in the hierarchical buffer 5 corresponding to that patch position. If the primitive passes the early depth test, then the depth range values stored in the relevant entry of the depth range value storage 21 of the hierarchical depth buffer 5 for the corresponding patch position are updated accordingly.

If, on the other hand, (upon reading the relevant bitmap entry) it is determined that depth information for that patch position is represented by depth function data stored in the depth function storage 22 of the hierarchical depth buffer 5 for the large patch, then this indicates that a primitive has already been processed which was found to completely cover the large patch (i.e. to completely cover the entire tile). In this case, prior to performing the depth test for the (smaller) patch generated by the rasterisation stage 3, the hierarchical depth tester 4 first uses the depth function data (representative of the previously-processed primitive that was found to completely cover the large patch) that is stored in the relevant entry of the depth function storage 22 of the hierarchical depth buffer 5 to calculate depth range values relating to the previously processed primitive (that was found to completely cover the large patch) in respect of the smaller patch position. (As will be understood, these depth range values will be representative of the completely-covering primitive that was processed earlier.)

In the present embodiment, the depth range values are derived from the depth function data (the depth plane equation) by evaluating the depths for various sampling positions across the patch. These newly-calculated depth range values are then used to perform the depth test in respect of the new primitive. Other arrangements would, of course, be possible.

After performing the depth test for the patch, the hierarchical depth tester 4 will store depth range values in the relevant entry of the depth function storage 22 of the depth buffer 5 for the corresponding patch position, based on the result of the depth test. The depth range values that will be stored for the smaller patch position may be depth values derived from the depth function data already stored in the depth buffer (i.e. representative of the previously processed primitive that was found to completely cover the large patch), or depth values relating to the new primitive in respect of which depth testing was performed (i.e. representative of the new primitive being processed), or a combination thereof.

The hierarchical depth tester 4 will also change the value stored in the bitmap entry corresponding to the patch position to indicate that, for the purposes of future depth testing, depth information for that patch position stored is represented by depth range values stored in the relevant entry of the depth value storage 22 in the hierarchical buffer 5 (rather than by depth function data in the depth function storage 22). (This corresponds to marking the depth function data as "invalid" in respect of that patch position.) In the technology described herein, this is done by changing the relevant entry corresponding to that patch position in the bitmap from "1" to "0".

The patch is then returned to the rasterisation stage 3 for subdivision into further smaller patches ("sub-patches") as discussed above.

Once the minimum patch size is reached (a patch of 2×2 fragments in this embodiment), the rasteriser 10 issues fragments that represent the patches (and thus sampling points) that pass the early hierarchical Z and stencil test stage 4 to the remainder of the graphics processing pipeline for processing.

The first part of this processing is to subject each fragment issued (output) by the rasteriser 10 to an early depth and stencil test in the early depth and stencil test stage 9. This early depth and stencil test stage 9 performs depth and stencil tests on the individual (covered) sampling positions associated with the fragments issued by the rasteriser 10 (i.e. at a per-sampling point resolution).

To do this, the early depth and stencil tester 9 uses per-sampling position depth and stencil values stored in the depth and stencil buffers 11. Thus, the depth and stencil buffers 11 store, in addition to the per-patch depth value ranges, an appropriate depth (Z) value and stencil value, respectively, for each sampling point that the buffer represents (essentially for each sampling point position of the tile that is being processed). These values are stored in the depth and stencil buffers 5 when sampling points being tested by the early depth and stencil testing stage 9 and the late depth and stencil testing stage 7 pass the respective depth and stencil tests (the stencil values can be stored/updated when the tests are failed as well).

The depth and stencil buffers 11 are configured as two distinct buffers (although they may in the same physical memory) in this embodiment, one buffer storing per-patch depth ranges, and the other storing per-sample depth values. Other arrangements would, of course, be possible.

The early depth and stencil test stage 9 is configured to operate in an appropriately conservative manner, as is known in the art.

Fragments that pass the early depth and stencil test stage 9 (i.e. fragments having at least one associated covered sampling position that passes the early depth and stencil test stage 9) are then sent onwards to the fragment shading stage 6 (the renderer), as shown in FIG. 1.

(Fragments that fail the early depth and stencil test stage 9 are culled by the early depth and stencil test stage 9, as is known in the art.)

The fragment shading stage 6 performs the appropriate fragment processing (rendering) operations on the fragments it receives, so as to process the fragments to generate the appropriate fragment data, etc., for the render output (e.g. for display of the fragments), as is known in the art.

This fragment processing may include any suitable and desired fragment shading processes, such as executing fragment shader programs on the fragments, applying textures to the fragments, applying blending, fogging or other operations to the fragments, etc., to generate the appropriate fragment data, as is known in the art. In the present embodiment, the fragment shading stage 6 is in the form of a shader pipeline (a programmable fragment shader), but other arrangements, such as the use also or instead of fixed function fragment shading units would be possible, if desired.

There is then a "late" fragment Z and stencil test stage 7, which (if it is to be performed, e.g. where a fragment did not undergo the early Z and stencil test) carries out, inter alia, the end of pipeline depth test on the shaded fragments (on the covered sampling points associated with shaded fragments) to determine whether the sampling points that a rendered fragment represents will overdraw the fragments whose values are currently stored in the buffer 11 (i.e. determines whether the fragment data for the fragments issuing from the fragment shading stage 6 should be stored in the tile buffers 8 (should replace or modify the fragment data in the tile buffer(s) of the fragments that have already been rendered)).

To do this, the late depth test stage 7 compares the depth values of (associated with) the fragments issued from the fragment shading stage 6 with the (per-sampling position) depth values stored in the depth buffer 5 for the sampling positions in question. The depth values for sampling points that pass the late depth test 7 are also written appropriately to the Z-buffer 5 to update it, as is known in the art.

This late fragment depth and stencil test stage 7 also carries out any necessary "late" alpha and/or stencil tests on the fragments.

The fragments that pass the late fragment test stage 7 are then subjected to any remaining operations necessary on the fragments, such as blending with the framebuffer, dither etc. (not shown).

Finally, the output fragment data values are written to appropriate tile buffers 8 that store, as is known in the art, an appropriate, e.g. colour, value for each sampling point that the buffers represent (in essence for each sampling point of the tile that is being processed).

Once each tile has been processed, its data is, e.g., exported from the tile buffers 8 to a main memory (e.g. to a frame buffer in a main memory) (not shown) for storage, and the next tile is then processed, and so on, until sufficient tiles have been processed to generate the entire render output (e.g. frame (image) to be displayed).

Other arrangements for the fragment processing pipeline would, of course, be possible.

The above describes certain features of the rasterisation and rendering processes of the graphics processing system shown in FIG. 1. An example process of operation of the rasteriser 10 of the graphics processing system shown in FIG. 1 in accordance with embodiments of the technology described herein will now be described, with reference to FIGS. 3A-C and FIGS. 4A-C.

Figure 3A:
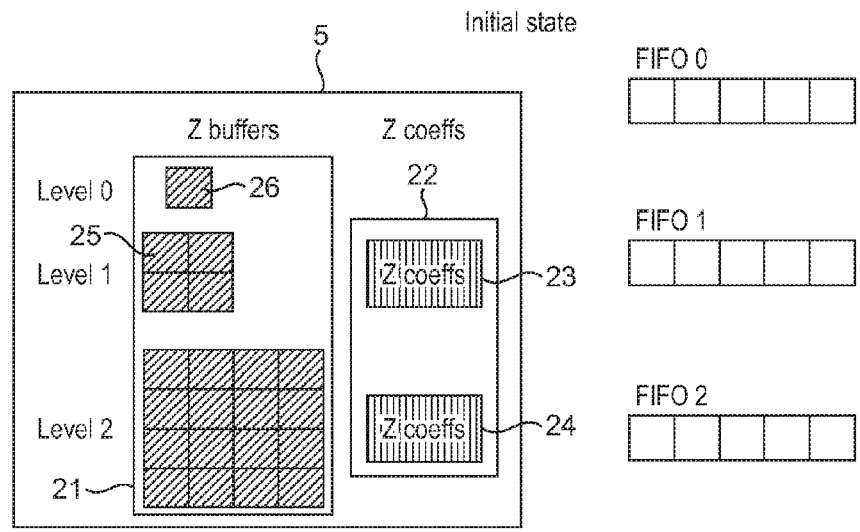
FIG. 3A shows schematically the initial state of a depth buffer in communication with a rasteriser that can operate in accordance with the technology described herein.

FIG. 3A shows a schematic of the hierarchical depth buffer 5 prior to processing primitives for a render output to be generated by the graphics processing system.

Prior to processing any primitives for the render output to be generated, each entry in the depth value storage 21 of the hierarchical depth buffer 5 is set to have default initial minimum depth value of 1.0 and a default initial maximum value of 1.0. Each entry in the bitmap stored in the hierarchical depth buffer is set to "0", to indicate that each patch position should be represented by this default depth data range (stored in the corresponding entry of the depth value storage 21), and, correspondingly, that any depth function data stored in the depth function storage 22 is "invalid" in respect of each and every patch position. (The entries of the depth function storage 22 may also be populated with default data values, if so desired. The default values themselves are of no consequence however, since, in this initial state, these entries are marked as "invalid", as described above.)

Figure 4A:
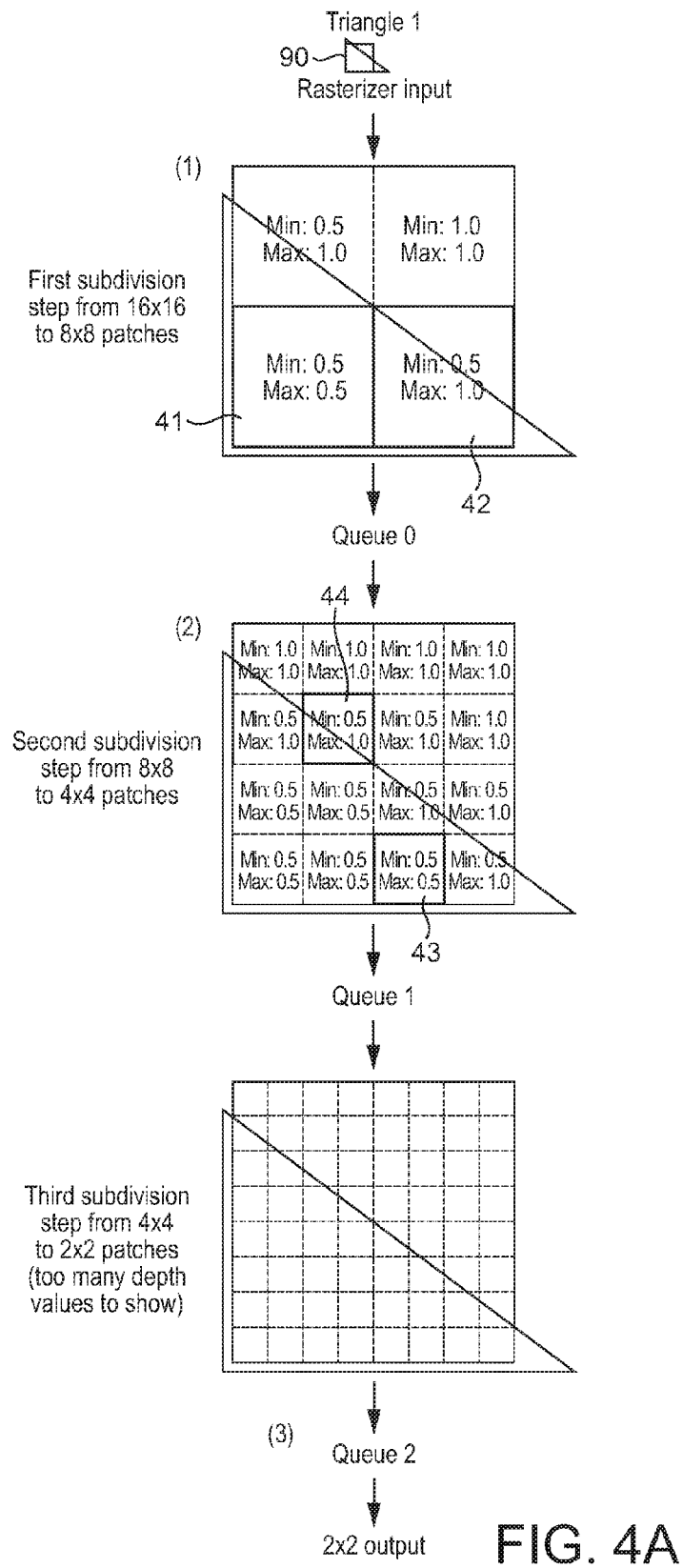
FIGS. 4A-C show example flow processes for processing three different primitives that may be performed by a rasteriser when operating in accordance with the described embodiment of the technology described herein.

FIG. 4A shows a flow process for a first primitive 90 that is processed by the graphics processing system. This primitive 90 only partially (i.e. not completely) covers the largest (level 0) patch (i.e. partially covers an entire tile). This primitive has a depth value of 0.5 for its entire area.

When processing this first primitive 90, the rasteriser 10 iteratively tests the primitive against progressively smaller patches of the render output area, as described above. Each patch generated by the rasterisation stage 3 is forwarded to the hierarchical depth tester 4 where it is to be subjected to depth testing. Prior to depth testing a particular patch the hierarchical depth tester 4 checks the bitmap entry to determine whether the corresponding patch position is represented by depth values stored in the depth value range storage 21, or by depth function data stored in depth function storage 22. The read bitmap entry will be necessary "0", since all patch positions are at this stage represented by the default depth max and min values of 1.0 stored in the depth value storage 21. Since the default value corresponds to the highest possible depth, each patch at least partially covered by this primitive 90 that is generated by the rasterisation stage 3 will necessarily pass the depth test.

After passing the depth test, the maximum and minimum depth values for the corresponding patch position entries in the depth value storage 21 will be updated accordingly. FIG. 4A, step (1), shows the various updated depth values for various patch positions.

Following the depth test, a patch is returned to the rasterisation stage 3 for further subdivision (as described above). Once the minimum patch size is reached (a patch of 2×2 fragments in this embodiment) the rasteriser issues the fragments representing the patches to the remainder of the pipeline for processing.

Whenever a patch passes the depth test, updated max and min depth range values for the relevant entry stored in the depth value storage 21 for the corresponding patch position are updated. Thus as more (and progressively smaller) patches generated by the rasterisation stage 3 pass the depth test, the buffer becomes increasingly populated with up-to-date depth range values relating to the primitive being processed. For example, entries for patch positions corresponding to patches 41 and 43 are updated to contain a max depth value of 0.5 and a min depth value of 0.5. Entries for patch positions corresponding to patches 42 and 44 are updated to contain a minimum depth value of 0.5 and a maximum depth value of 1.0 (FIG. 4A, steps (1) and (2)).

Figure 4B:
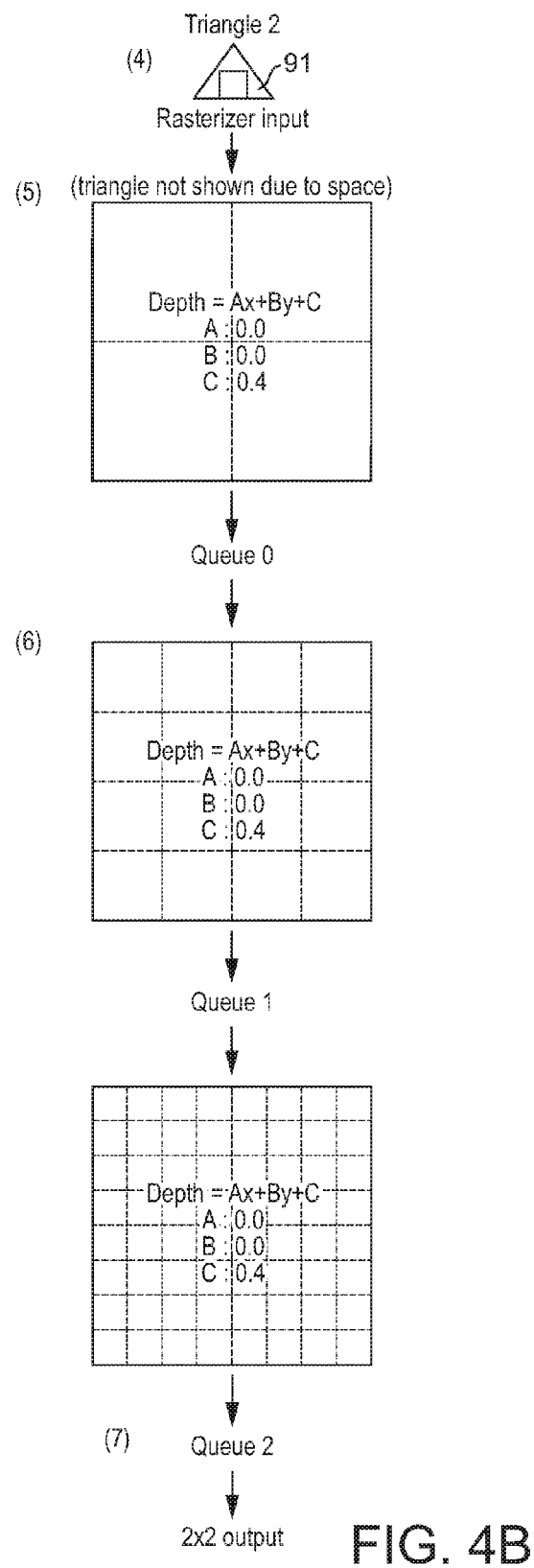

FIG. 4B shows a flow process for a second primitive 91 that is processed by the graphics processing system after (following) the first primitive 90. This second primitive 91 completely covers the largest (level 0) patch (i.e. completely covers an entire tile), and has a depth value of 0.4 for its entire area (FIG. 4B, step (4)). (In this example, a lower depth value corresponds to a closer position to the viewpoint; thus this second primitive 91 is in front of the first primitive 90).

When processing this second primitive 91, the rasterisation stage 3 first tests the largest patch of the render output against this second primitive, to determine if the primitive at least partially covers this larger patch. The rasterisation stage 3 will thus determine that the large patch is completely covered by this primitive 91, and will forward the generated large patch to the hierarchical depth testing stage 4. The hierarchical depth testing stage 4 then performs a depth test in respect of a large patch, using the depth range values stored for the large patch position in the relevant entry 26 of the depth value storage 21 of the hierarchical depth buffer 5.

Since the primitive 91 is in front of the (only) other primitive (the first primitive 90) that has already been processed for the tile, the second primitive 91 will pass its depth test with respect to the large patch. Depth range values that are stored in the corresponding entry 26 of the data value storage 21 for the large patch position will then be updated with depth range values relating to the second primitive 91.

Instead of returning the completely-covered large patch to the rasterisation stage 3 to be subdivided into smaller patches (with a view to performing further depth tests in respect of these smaller patches to fully update every entry in the depth value storage 21 of the depth buffer 5), the hierarchical depth testing stage 4 instead stores depth function data representative of the completely-covering primitive in entry 23 of the depth function storage 22 of the depth buffer 5 (FIG. 4B, step (5)).

As described above, in the present embodiment the depth function data that is stored comprises the values of the coefficients a, b and c of the z-plane function of the form ax+by+c that represents the depth values for the primitive being processed (that completely covers the large patch) across the large patch. For this primitive 91, which has a depth of 0.4 across its entire area, the depth function data values that are stored in the entry 23 of the depth function storage 23 will be a=0.0; b=0.0 and c=0.4. As the primitive 91 is forwarded through the pipeline, these values will also be propagated into the depth function entry 24 (as shown in FIG. 3B).

As the primitive 91 is forwarded through the pipeline, the rasteriser 10 also updates the values stored in the bitmap for each (every) smaller patch position that is encompassed by the large patch, to show that each of these patch positions are now no longer represented by depth range data values stored in the depth value storage 21 for the individual patch positions, but are instead represented by the depth function data for the primitive 91 stored in the corresponding entry of the depth function storage 22. (This corresponds to marking the depth value data stored in the depth value buffer 21 for each patch position as "invalid" in respect of that patch position). In the present embodiment, the hierarchical rasterisation ZS stage 4 does this by setting each entry of the bitmap stored in the depth buffer 5 to "1".

The rasteriser 10 then issues fragments representing the completely-covered large patch to the remainder of the graphics processing pipeline for processing.

Figure 3B:
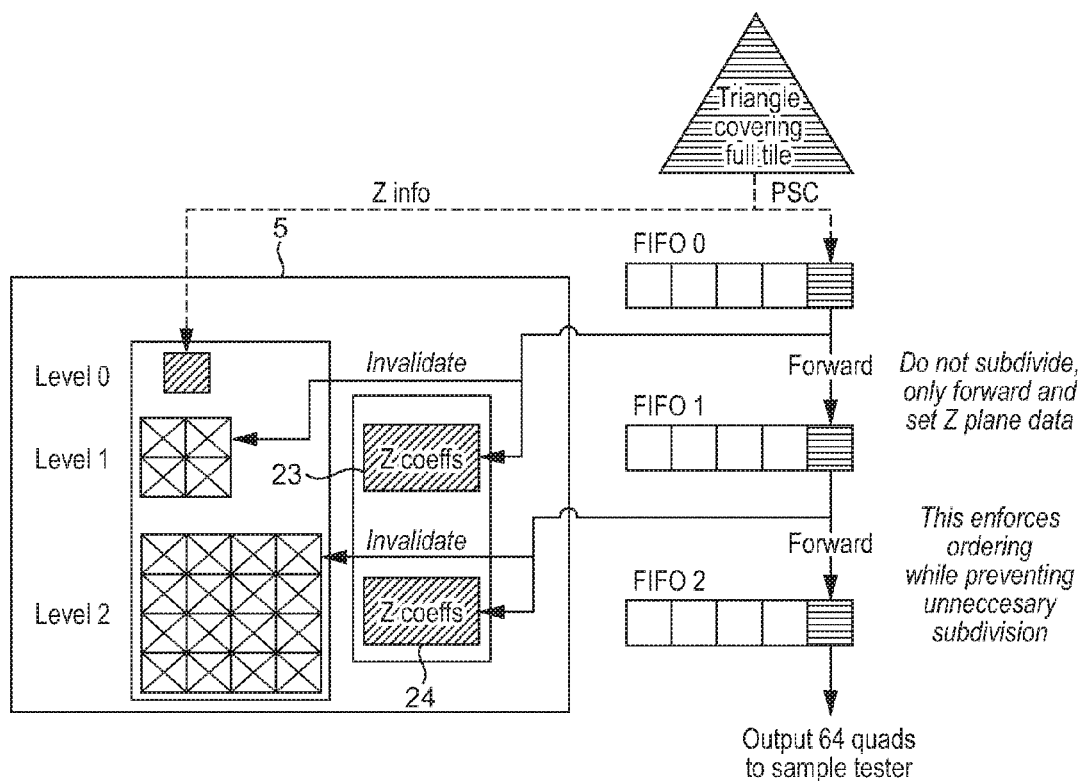
FIG. 3B shows schematically the state of a depth buffer in communication with a rasteriser that can operate in accordance with the technology described herein, after processing a primitive.

FIG. 3B shows a schematic representation of the hierarchical depth buffer 5 after this second primitive has been processed by the rasteriser 10. In FIG. 3B, crosses are used to show that the depth values stored in entries in the depth value storage 22 are invalid in respect of their corresponding patch position. As can be seen from FIG. 3B, after the second primitive (that was found to completely cover the large patch) is processed by the rasteriser 10, each of these entries (for all patches smaller than the largest patch) are marked as "invalid" in respect of their corresponding patch position. The depth information for this indicates that each of the patch positions corresponding to these entries are now represented in the hierarchical depth buffer 5 by the depth function data (for the second primitive 91) stored in the relevant entry of the depth function storage 22.

Figure 4C:
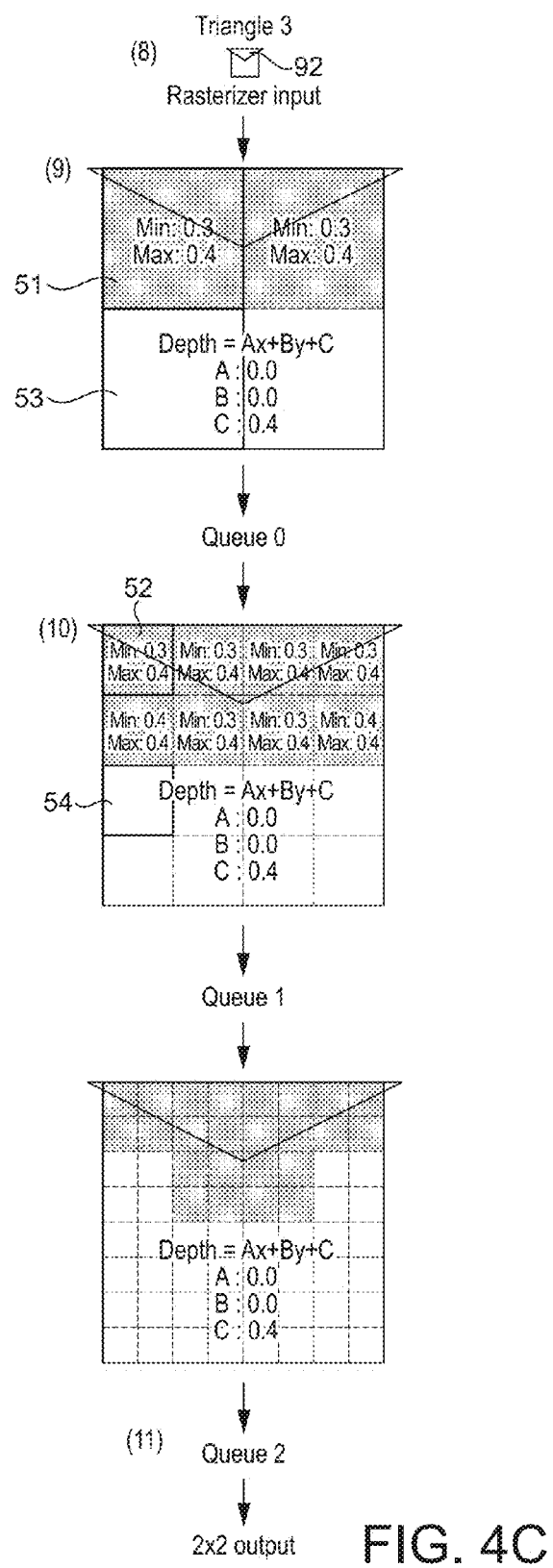

FIG. 4C shows a flow process for a third primitive 92 that is processed by the graphics processing system after (following) the second (and first) primitive (FIG. 4C, step (8)). This primitive 92 only partially (i.e. not completely) covers the largest (level 0) patch (i.e. only partially covers an entire tile). This primitive has a depth value of 0.3 for its entire area, and is thus in front of the second primitive 91 (and the first primitive 90).

When processing this third primitive 92, the rasterisation stage 3 once again first tests the largest patch against this third primitive 92, to determine if the primitive at least partially covers the largest patch. The rasterisation stage 3 will then determine that the largest patch is partially covered by this primitive 92, and will forward the generated large patch to the hierarchical depth testing stage 4.

The hierarchical depth testing stage 4 then performs a depth test in respect of this largest patch, using the depth range values stored for the large patch position in the relevant entry 26 of the depth value storage 21 of the hierarchical depth buffer 5. (As will be understood from the above, this entry will now contain depth range values relating to the second primitive 91). Since this third primitive 92 is in front of the second primitive 91 (that has already been processed for the render output), the large patch that is partially covered by the third primitive 92 will pass its depth test. Depth range values that are stored in the corresponding entry 26 of the data value storage 21 for the large patch position will then be updated accordingly.

Since the third primitive 92 was determined to only partially (i.e. not completely) cover the large patch, the large patch is returned to the rasterisation stage 3 for further subdivision. The smaller sub-patches resulting from this subdivision are then tested against the primitive 92, and those patches that are (at-least partially) covered by the third primitive 92 are forwarded to the hierarchical depth testing stage 4 for depth testing themselves.

When performing the depth test in respect of a smaller patch generated by the rasterisation stage 3, which is covered (at least partially) by the third primitive 92, the hierarchical depth tester 4 first reads the bitmap entry for the corresponding patch position in the bitmap stored in the hierarchical depth buffer 5, to determine whether up-to-date depth information for the patch is represented by depth range values stored in the depth value storage 21, or is, instead, represented by depth function data stored in the depth function storage 22. As discussed above, after processing the second primitive 91, each of the corresponding patch positions were represented in the depth buffer 5 by depth function data stored in the depth function storage 22 (and not by the depth range values stored in corresponding entries in the depth value buffer 21 (thus these values will be marked as "invalid")). Thus when the hierarchical depth testing stage 4 reads the entry corresponding to the position of a patch that is to be depth tested, it will read a "1", indicating that the patch position is represented by depth function data stored in the depth function storage 22.

After determining that the relevant patch position (corresponding to the patch being 'tested') is represented by depth function data (relating to the second primitive 91), the hierarchical depth testing stage retrieves the depth function from the relevant entry of the depth function storage 22, and uses it to calculate depth values relating to the second primitive 91 across the smaller patch. These calculated depth values (relating to the second primitive 91) are then used to perform a depth test in respect of the generated patch (that is the patch that is (at least partially) covered by the third primitive 92).

After performing the depth test, the hierarchical rasterisation depth tester 4 will store depth range values in the relevant entry of the depth range value storage 21 of the depth buffer 5 for the corresponding patch position, based on the result of the depth test. In this example, as the third primitive 92 is in front of the second primitive 91, the new max depth value stored will be 0.4 (relating to the second primitive 91) and the new min depth value stored will be 0.3 (relating to the third primitive 92).

After performing the depth test for a patch, the hierarchical testing unit 4 will also change the value stored in the bitmap entry corresponding to that patch position from a "1" to a "0", to indicate that that patch position is now represented in the depth buffer 5 by the depth value stored in the corresponding entry of the depth value storage 21 (and not by the depth function data stored in the depth function storage 23, which is now marked as "invalid"). The patch is then returned to the rasterisation stage 3 for further subdivision. Once the minimum patch size is reached, the rasteriser issues fragments representing the patches to the remainder of the graphics processing pipeline for processing.

Figure 3C:
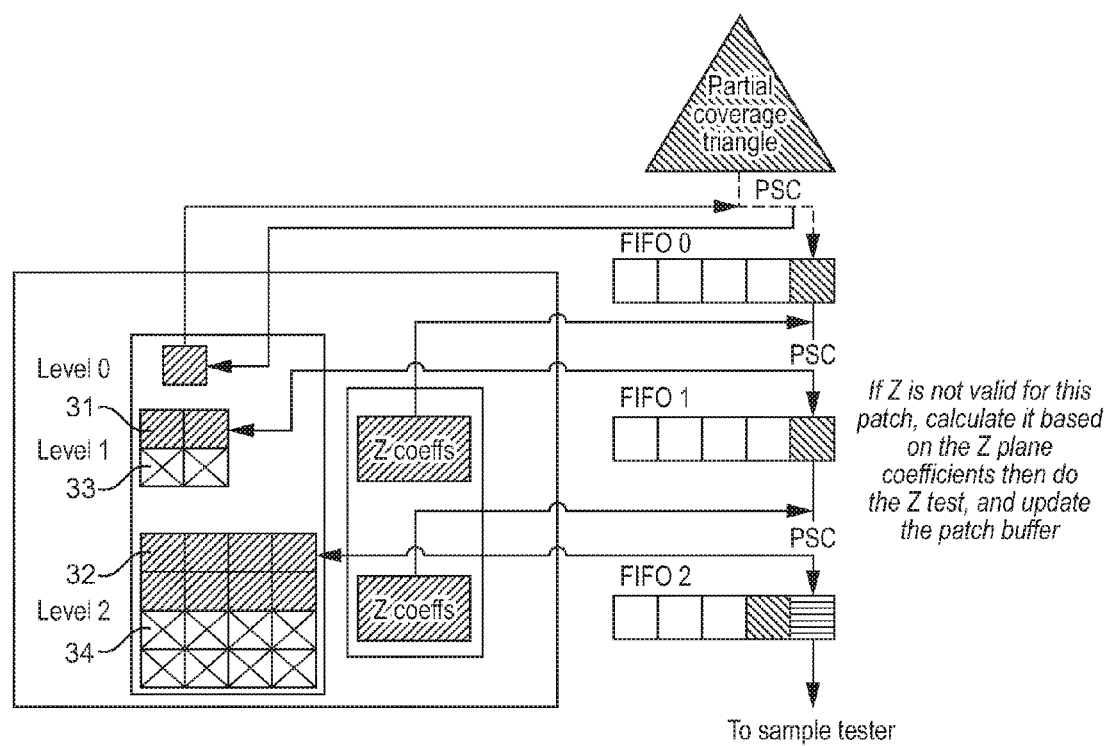
FIG. 3C shows schematically the state a depth buffer in communication with a rasteriser that can operate in accordance with the technology described herein, after processing another primitive.

FIG. 3C shows a schematic representation of the hierarchical depth buffer 5 after this third primitive 92 has been processed by the rasteriser 10. FIG. 3C shows that, following processing of the third primitive 92 by the rasteriser 10, some patch positions are represented in the depth buffer 5 by the depth range values (corresponding to the second primitive 91 and third primitive 92) stored in the corresponding entries of the depth value storage 21. These patch positions have a value of "0" in their corresponding bitmap entries.

Other patch positions, however, are represented in the depth buffer 5 by depth function data (representative of the second primitive 91) stored in the corresponding entries of the depth function storage 22 (and these patch positions have a value of "1" in their corresponding bitmap entries). In particular, the positions for patches that were found to be (at least partially) covered by the third primitive 92 will be represented by depth range values, whilst the positions for patches that were found not to be (at least partially) covered by the third primitive 92 continue to be represented by the depth function data relating to the second primitive 91.

For example, the positions corresponding to patches 51 and 52 are represented by depth range values in their corresponding entries 31 and 32, respectively. The value of "0" that is stored in the corresponding entries of the bitmap for those patch positions indicate that the depth function data stored in the depth function storage 22 relating to the second primitive 91 is "invalid" in respect of these patch positions. However positions corresponding to patches 53 and 54 are not represented by the depth range values stored in their corresponding entries of the depth range storage (entries 33 and 34 respectively), but are instead represented by the depth function data stored in entries 35 and 36 of depth function storage 22, respectively. The value of "1" that is stored in the corresponding entries of the bitmap for those patch positions indicate that the depth function data stored in the depth function storage 22 relating to the second primitive 91 is "valid" in respect of these patch positions (and hence, correspondingly, that the depth range values stored in entries 33 and 34 are "invalid").

When performing depth tests for patches relating to future primitives to be processed by the rasteriser 10 for the tile, the hierarchical tester 4 first checks the relevant bitmap entry for the corresponding patch position to determine whether that position is represented by depth function data, or is represented by depth range values.

In the embodiment described above, depth range data is stored for the largest (level 0) patch size position when it is determined that a largest patch (corresponding to an entire tile) is completely covered by a primitive. This process is illustrated in FIG. 3B, for example, which shows depth range values for the second primitive 91 (that has been determined to completely cover the largest (level 0) patch) being stored in the largest patch position entry 26 of the depth value storage 21, after that primitive has passed a depth test in respect of the largest patch. In the embodiment described above, depth range values for a primitive in respect of a largest patch position are calculated at an early stage when performing a depth test for that primitive in respect of a largest patch position. The system is then able to update the relevant entry 26 of the depth value storage 21 for the largest patch position with depth range values based on the result of the depth test.

However the Applicants have recognised there could be systems wherein the early calculation of depth range values (e.g. to perform a depth test, or to determine whether or not a primitive completely covers a largest patch) is not necessary. For example, it may already be known (e.g. prior to rasterisation) that a particular primitive completely covers a largest (level 0) patch and, furthermore, that that primitive is in front of all other primitives that have already been processed for that largest patch. In this situation, there is no need to calculate depth range values for a completely-covering primitive at the early stage to, e.g., perform a depth test in respect of the largest patch position or to determine if the largest patch is completely covered by the primitive.

The Applicants have therefore recognised that, in the case where it is not necessary to already calculate any depth range values in respect of a largest patch position for a primitive that completely covers the patch, it may be beneficial to adapt the system to store depth function data for that primitive for the largest patch position, rather than (i.e. instead of) storing depth range values for the largest patch position, when processing that primitive. This depth function data may for this largest patch size may then be retrieved and used to calculate depth range values when processing subsequent primitives, in the manner described above in relation to the other (i.e. level 1 and level 2) patches.

Figure 5A:
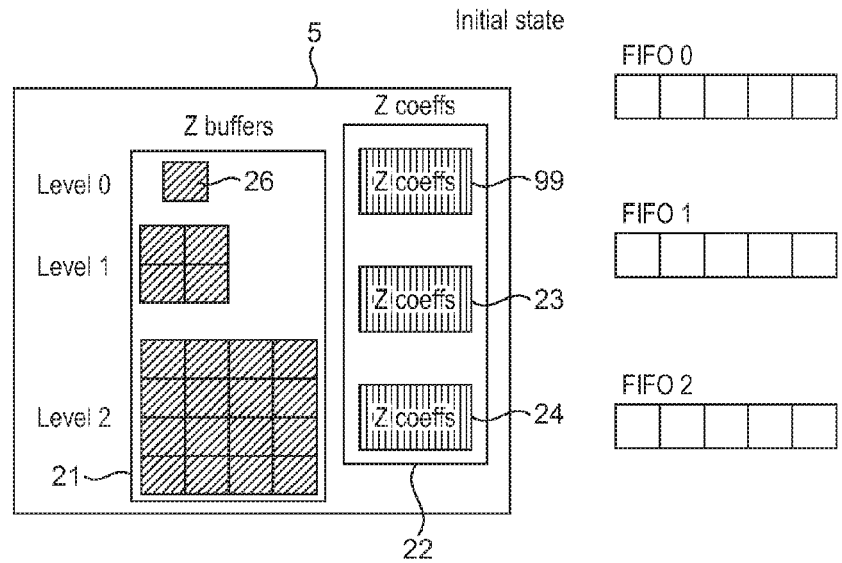
FIG. 5A shows schematically the state of a depth buffer in communication with a rasteriser than can operate according to an alternative embodiment of the technology described herein.
Figure 5B:
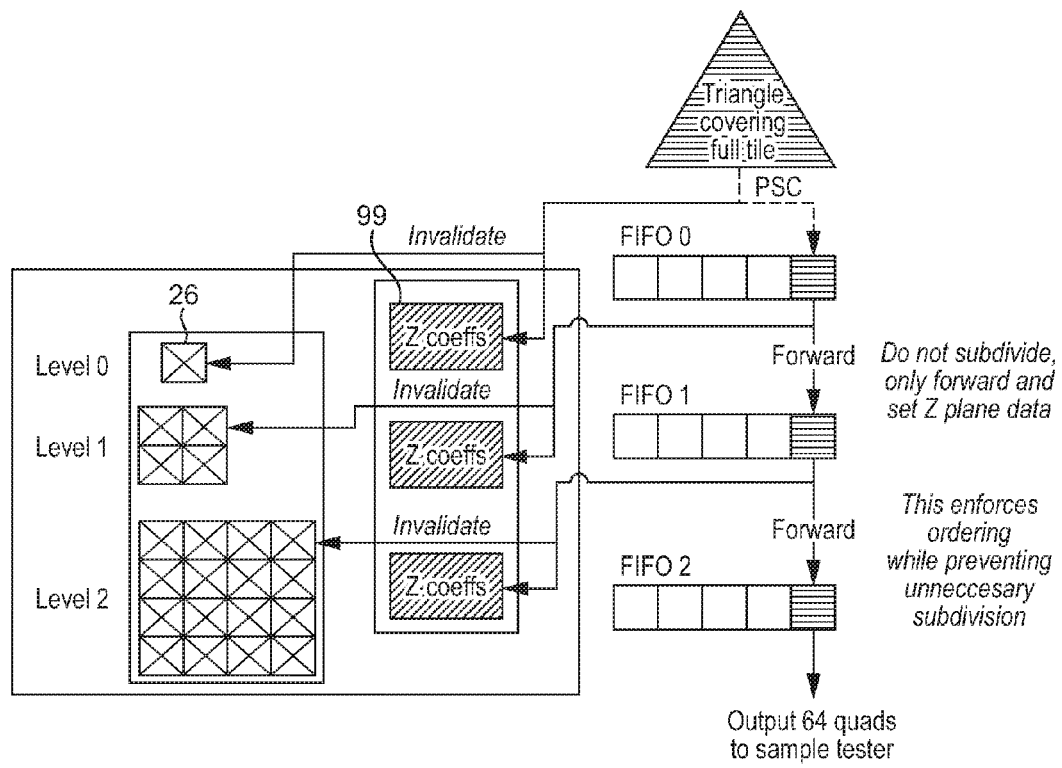
FIG. 5B shows schematically the state of a depth buffer in communication with a rasteriser that can operate according to an alternative embodiment of the technology described herein, after processing a primitive.
Figure 5C:
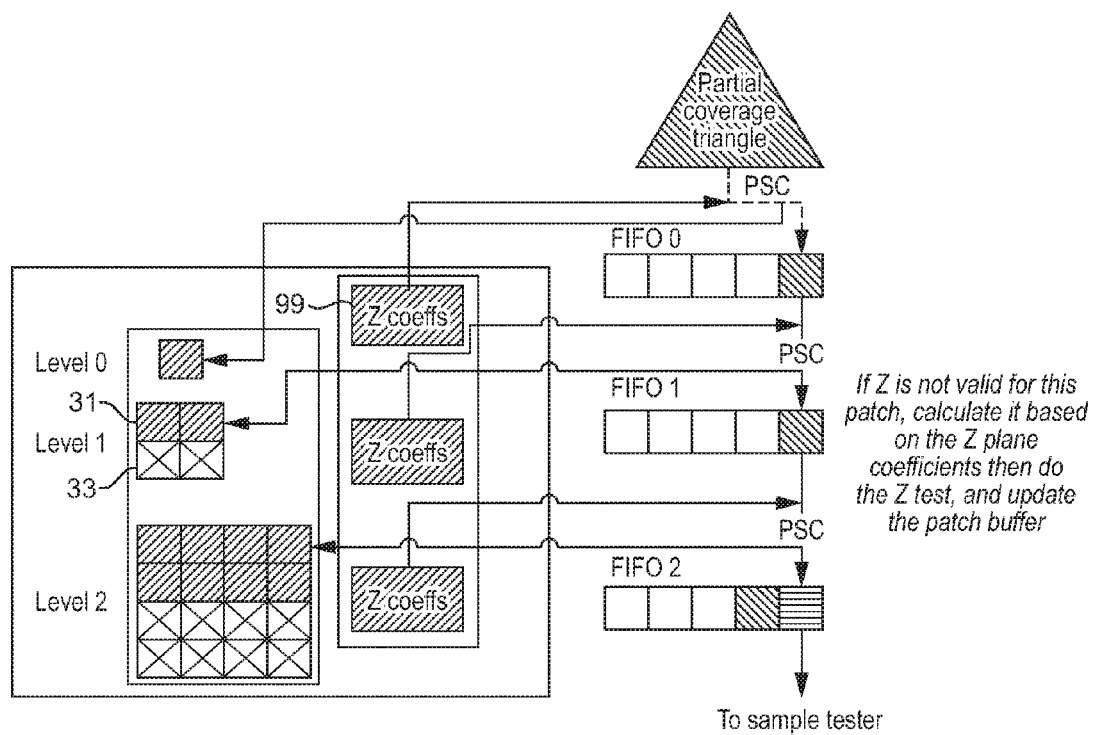
FIG. 5C shows schematically the state a depth buffer in communication with a rasteriser that can operate according to an alternative embodiment of the technology described herein, after processing another primitive.

One such embodiment is shown in FIGS. 5A-C, which illustrate example flow processes for processing the same three primitives 90, 91, and 92 according to another embodiment of the technology described herein. In this embodiment, depth function storage 22 includes an additional entry 99 that corresponds to the largest (level 0) patch position (compared to the embodiment shown in FIGS. 3A-C, as described above).

When processing second primitive 91 (which completely covers the largest patch), shown in FIG. 5B, rather than storing depth range values for the primitive in the entry 26 for the largest patch position of the data value storage 21, the rasteriser stores depth function data values representative of the primitive in entry 99 of the depth function storage 22 (corresponding to FIG. 4B, step (5)). The rasteriser also marks the depth range values stored in entry 26 of the depth value storage 21 as "invalid" in respect of the largest patch position. (This may be done in a similar manner to that as described above for the embodiment of FIGS. 3A-C when marking patch positions as invalid, i.e. by updating a bitmap entry corresponding to the largest patch position to indicate that the largest patch position should no longer be represented by depth function data.)

As the primitive 91 is forwarded through the pipeline, these depth function values for the primitive 91 are then propagated down into depth function entries 23 and 24 of depth function storage 22, and depth range values for each (and every) smaller patch position are marked as "invalid" by updating the bitmap accordingly. As can be seen in FIG. 5B, by the time the rasteriser issues fragments representing primitive 91 to the remainder of the graphics processing pipeline, the primitive 91 is represented in the depth buffer 5 by depth function data values only (and hence is not represented at all by depth range data values).

When processing the third primitive 92, shown in FIG. 5C, the hierarchical depth tester reads the bitmap entry corresponding to the largest patch position to determine that up-to-date depth information for the patch is represented by depth function data (representative of primitive 91) stored in the entry 99 corresponding to the largest patch position of the depth function storage 22 (and not, as will be understood, by any depth range values stored in the corresponding entry 26 of depth range storage 21). The hierarchical depth testing stage then retrieves the depth function data from the entry 99 of the depth function storage 22, and uses it to calculate depth values (relating to the second primitive 91) across the largest patch. These calculated depth values (relating to primitive 91) are then used to perform a depth test in respect of the third primitive 92 for the large patch.

After performing the depth test, the hierarchical rasterisation tester 4 stores depth range values in the entry 26 (corresponding to the largest patch position) of the depth range value storage 21, based on the result of the depth test, and updates the relevant bitmap entry to indicate that the largest patch position is now represented in the depth buffer 5 by the depth range values stored in entry 26 (and not by depth function data stored in entry 99, which is now marked as "invalid"). The largest patch is then returned to the rasterisation stage 3 for further subdivision.

In the embodiments described above, depth function data for a primitive is only stored if it is determined that that primitive completely covers the largest patch (which corresponds to covering an entire tile).

However the Applicants have also recognised that it would be possible to adapt the system to also store depth function data for a primitive when it is found that that primitive completely covers a smaller (but does not completely cover the largest) patch. In such an embodiment, smaller patches would be tested to determine if they are completely covered by a primitive. When it is determined that a patch (other than the largest patch) is completely covered by a primitive, depth function data would be stored for the completely covered patch. The system would be able to skip any further subdivision of that patch, and the bitmap entries corresponding to patch positions for patches encompassed by the completely covered patch would be changed (i.e. set to "1") to indicate that valid depth function data is stored for those patch positions (and, correspondingly, that the depth range values for those patch positions are "invalid").

It can be seen from the above that the technology described herein comprises a process and rasteriser that can reduce the total number of depth data calculations that will need to be carried out when processing primitives which are found to completely cover larger patches of the render output, thereby, e.g. reducing power consumption. Moreover, the reduction in power consumption is achieved whilst maintaining the ability to efficiently (potentially) cull primitives that are subsequently processed.

This is achieved, in the embodiments of the technology described herein at least, by storing depth function data for primitives that completely cover a larger patch of the render output. This depth function is then used to calculate depth values for smaller patches that are encompassed by the larger patch, if and when a subsequently processed primitive for the render output is found to at least partially cover those smaller patches.

The foregoing detailed description has been presented for the purposes of illustration and description. It is not intended to be exhaustive or to limit the technology to the precise form disclosed. Many modifications and variations are possible in the light of the above teaching. The described embodiments were chosen in order to best explain the principles of the technology and its practical application, to thereby enable others skilled in the art to best utilise the technology in various embodiments and with various modifications as are suited to the particular use contemplated. It is intended that the scope be defined by the claims appended hereto.

What is claimed is:

1. A method of processing primitives when generating a render output in a graphics processing system in which, for the purposes of generating a render output, the render output is divided into a plurality of larger patches, each larger patch of the render output encompassing a set of plural smaller patches of the render output, the method comprising:
   testing a larger patch of the render output against a first primitive to be processed to generate the render output, to determine if the first primitive at least partially covers the larger patch of the render output; and
   when it is determined that the first primitive completely covers the larger patch of the render output:
      storing depth function data for the first primitive for the larger patch of the render output;
   the method further comprising:
   testing the larger patch of the render output against a second primitive to be processed to generate the render output, to determine if the second primitive at least partially covers the larger patch of the render output; and
   when it is determined that the second primitive at least partially covers the larger patch of the render output, and when depth function data is stored for the larger patch of the render output:
      using the depth function data stored for the larger patch of the render output to calculate depth data for the first primitive for each smaller patch of the render output of the set of plural smaller patches of the render output that the larger patch encompasses and that is at least partially covered by the second primitive;
      using the newly-calculated depth data for the first primitive to perform a depth test in respect of the second primitive for each smaller patch of the render output of the set of plural smaller patches of the render output that is at least partially covered by the second primitive;
      storing depth data for each smaller patch of the render output of the set of plural smaller plural patches of the render output that is at least partially covered by the second primitive according to the result of the depth test; and
      marking the depth function data stored for the larger patch as invalid in respect of each smaller patch of the render output of the set of plural smaller patches of the render output that was determined to be at least partially covered by the second primitive, so that each smaller patch of the render output of the set of plural smaller patches of the render output that was determined to be at least partially covered by the second primitive is represented by the depth data stored for the respective smaller patch, but each smaller patch of the render output of the set of plural smaller patches of the render output not determined to be at least partially covered by the second primitive remains represented by the depth function data for the first primitive.

2. The method of claim 1, wherein the graphics processing system is a tile-based graphics processing system, and the larger patch of the render output comprises a tile of the render output.

3. The method of claim 1, wherein each smaller patch of the render output encompasses a set of plural further smaller patches of the render output.

4. The method of claim 3, further comprising:
   when it is determined that the first primitive completely covers the larger patch of the render output, also storing depth function data for the first primitive for each smaller patch that the larger patch encompasses; and
   when it is determined that the second primitive at least partially covers a smaller patch that the larger patch encompasses, using the depth function data stored for the smaller patch to calculate depth data for the first primitive for each further smaller patch of the render output of the set of plural further smaller patches that the smaller patch encompasses and that is at least partially covered by the second primitive.

5. The method of claim 1, further comprising:
   when it is determined that the first primitive does not completely cover the large patch of the render output, testing at least some of the smaller patches of the render output against the first primitive, to determine if the first primitive at least partially covers the at least some of the smaller patches of the render output; and
   when it is determined that the first primitive completely covers at least some smaller patches of the render output, storing depth function data for the first primitive for the at least some completely covered smaller patches of the render output.

6. The method of claim 1, wherein the depth function data for the first primitive comprises data representing the values of coefficients of a depth plane equation relating to the first primitive.

7. The method of claim 1, wherein the depth data for the first primitive calculated for each smaller patch of the render output of the set of plural smaller patches of the render output that the larger patch encompasses comprises depth range data for that smaller patch relating to the first primitive.

8. The method of claim 1, wherein the step of marking the depth function data stored for the larger patch as invalid in respect of each smaller patch of the render output of the set of plural smaller patches of the render output that was determined to be at least partially covered by the second primitive comprises:
   storing values in a bitmap that is representative of the set of plural smaller patches.

9. A graphics processing system in which, for the purposes of generating a render output, the render output is divided into a plurality of larger patches, each larger patch of the render output encompassing a set of plural smaller patches of the render output, the graphics processing system comprising a rasteriser that is configured to:
   test a larger patch of the render output against a first primitive to be processed to generate the render output, to determine if the first primitive at least partially covers the larger patch of the render output; and
   when it is determined that the first primitive completely covers the larger patch of the render output:
      store depth function data for the first primitive for the larger patch of the render output;
   the rasteriser further configured to:
   test the larger patch of the render output against a second primitive to be processed to generate the render output, to determine if the second primitive at least partially covers the larger patch of the render output; and to when it is determined that the second primitive at least partially covers the larger patch of the render output, and when depth function data is stored for the larger patch of the render output:

use the depth function data stored for the larger patch of the render output to calculate depth data for the first primitive for each smaller patch of the render output of the set of plural smaller patches of the render output that the larger patch encompasses and that is at least partially covered by the second primitive;

use the newly-calculated depth data for the first primitive to perform a depth test in respect of the second primitive for each smaller patch of the render output of the set of plural smaller patches of the render output that is at least partially covered by the second primitive;

store depth data for each smaller patch of the render output of the set of plural smaller plural patches of the render output that is at least partially covered by the second primitive according to the result of the depth test; and mark the depth function data stored for the larger patch as invalid in respect of each smaller patch of the render output of the set of plural smaller patches of the render output that was determined to be at least partially covered by the second primitive, so that each smaller patch of the render output of the set of plural smaller patches of the render output that was determined to be at least partially covered by the second primitive is represented by the depth data stored for the respective smaller patch, but each smaller patch of the render output of the set of plural smaller patches of the render output not determined to be at least partially covered by the second primitive remains represented by the depth function data for the first primitive.

10. The graphics processing system of claim 9, wherein the graphics processing system is a tile-based graphics processing system, and the larger patch of the render output comprises a tile of the render output.

11. The graphics processing system of claim 9, wherein each smaller patch of the render output encompasses a set of plural further smaller patches of the render output.

12. The graphics processing system of claim 11, wherein the rasteriser is further configured to:

when it is determined that the first primitive completely covers the larger patch of the render output, store depth function data for the first primitive for each smaller patch that the larger patch encompasses; and when it is determined that the second primitive at least partially covers a smaller patch that the larger patch encompasses, use the depth function data stored for the smaller patch to calculate depth data for the first primitive for each further smaller patch of the render output of the set of plural further smaller patches that the smaller patch encompasses and that is at least partially covered by the second primitive.

13. The graphics processing system of claim 9, wherein the rasteriser is further configured to:

when it is determined that the first primitive does not completely cover the large patch of the render output, test at least some of the smaller patches of the render output against the first primitive, to determine if the first primitive at least partially covers the at least some of the smaller patches of the render output; and when it is determined that the first primitive completely covers at least some smaller patches of the render output, store depth function data for the first primitive for the at least some completely covered smaller patches of the render output.

14. The graphics processing system of claim 9, wherein the depth function data for the first primitive comprises data representing the values of coefficients of a depth plane equation relating to the first primitive.

15. The graphics processing system of claim 9, wherein the depth data for the first primitive calculated for each smaller patch of the render output of the set of plural smaller patches of the render output that the larger patch encompasses comprises depth range data for that smaller patch relating to the first primitive.

16. The graphics processing system of claim 9, wherein the rasteriser is further configured to, when performing the step of marking the depth function data stored for the larger patch as invalid in respect of each smaller patch of the render output of the set of plural smaller patches of the render output that was determined to be at least partially covered by the second primitive:

store values in a bitmap that is representative of the set of plural smaller patches.

17. A non-transitory computer readable storage medium storing computer software code which when executing on at least one processor performs a method of processing primitives when generating a render output in a graphics processing system in which, for the purposes of generating a render output, the render output is divided into a plurality of larger patches, each larger patch of the render output encompassing a set of plural smaller patches of the render output, the method comprising:

testing a larger patch of the render output against a first primitive to be processed to generate the render output, to determine if the first primitive at least partially covers the larger patch of the render output; and when it is determined that the first primitive completely covers the larger patch of the render output:

storing depth function data for the first primitive for the larger patch of the render output;

the method further comprising:

testing the larger patch of the render output against a second primitive to be processed to generate the render output, to determine if the second primitive at least partially covers the larger patch of the render output; and when it is determined that the second primitive at least partially covers the larger patch of the render output, and when depth function data is stored for the larger patch of the render output:

using the depth function data stored for the larger patch of the render output to calculate depth data for the first primitive for each smaller patch of the render output of the set of plural smaller patches of the render output that the larger patch encompasses and that is at least partially covered by the second primitive;

using the newly-calculated depth data for the first primitive to perform a depth test in respect of the second primitive for each smaller patch of the render output of the set of plural smaller patches of the render output that is at least partially covered by the second primitive;

storing depth data for each smaller patch of the render output of the set of plural smaller plural patches of the render output that is at least partially covered by the second primitive according to the result of the depth test; and marking the depth function data stored for the larger patch as invalid in respect of each smaller patch of the render output of the set of plural smaller patches of the render output that was determined to be at least partially covered by the second primitive, so that each smaller patch of the render output of the set of plural smaller patches of the render output that was determined to be at least partially covered by the second primitive is represented by the depth data stored for the respective smaller patch, but each smaller patch of the render output of the set of plural smaller patches of the render output not determined to be at least partially covered by the second primitive remains represented by the depth function data for the first primitive.

* * * * *